United States Patent [19]

Masuda et al.

[11] Patent Number: 4,621,925
[45] Date of Patent: Nov. 11, 1986

[54] FIBER-OPTIC GYRO

[75] Inventors: Shigefumi Masuda, Yokohama; Takeo Iwama, Kawasaki, both of Japan

[73] Assignee: Fujitsu Limited, Kawasaki, Japan

[21] Appl. No.: 534,126

[22] Filed: Sep. 20, 1983

[30] Foreign Application Priority Data

Nov. 11, 1982 [JP] Japan ............... 57-198058
Jan. 14, 1983 [JP] Japan ............... 58-004409

[51] Int. Cl.$^4$ .................. G01B 9/02; G01C 19/64
[52] U.S. Cl. ........................................... 356/350
[58] Field of Search .................. 356/350, 351; 350/96.18

[56] References Cited

U.S. PATENT DOCUMENTS

| | | | |
|---|---|---|---|
| 4,272,194 | 9/1978 | Gievers | 356/350 |
| 4,286,878 | 9/1981 | Pircher | 356/350 |
| 4,410,275 | 10/1983 | Shaw et al. | 356/350 |
| 4,444,503 | 4/1984 | Schiffner | 356/350 |
| 4,483,617 | 11/1984 | Matsumura | 356/350 |

OTHER PUBLICATIONS

"Fiber-Ring Interferometer: Polarization Analysis", Ulrich et al., Optics Letters, vol. 4, No. 5, May 1979.

*Primary Examiner*—Davis L. Willis
*Assistant Examiner*—S. A. Turner
*Attorney, Agent, or Firm*—Staas & Halsey

[57] ABSTRACT

A fiber-optic gyro includes a laser diode, a light detector, first and second lenses arranged on both sides of a half mirror, and a coil-like optical fiber which is arranged so that the two ends of the optical fiber confront the first and second lenses, respectively. Light from the laser diode is incident on the half mirror through the first lens, the light reflected from the half mirror is incident from one end of the coil-like optical fiber through the first lens, and the light transmitted through the half mirror is incident from the other end of the coil-like optical fiber through the second lens. Therefore the light is propagated through the coil-like optical fiber in opposite directions, light from the coil-like optical fiber is synthesized and is incident on the light detector, and the speed of the rotation angle is detected by the output of the light detector.

15 Claims, 38 Drawing Figures

Fig. 12
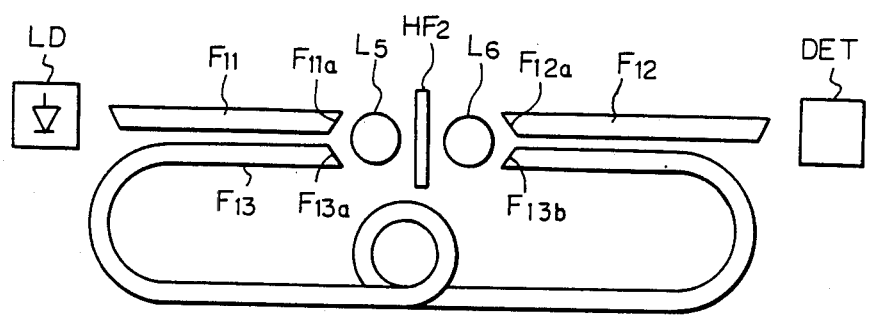
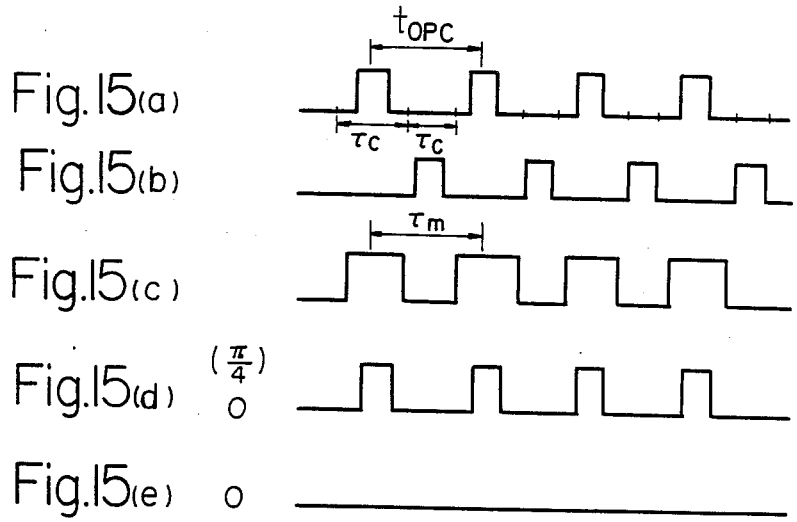
Fig. 15(a)
Fig. 15(b)
Fig. 15(c)
Fig. 15(d)
Fig. 15(e)

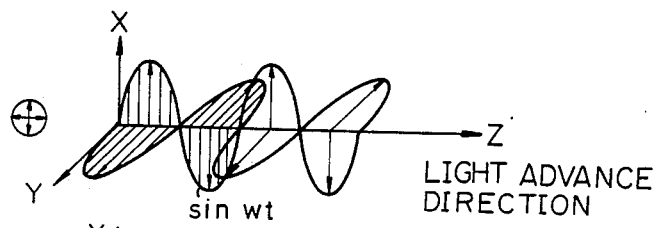
Fig.14(a)
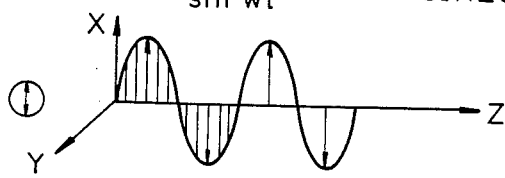
Fig.14(b)
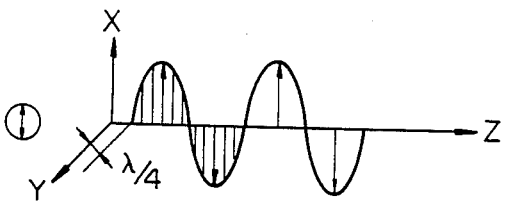
Fig.14(c)
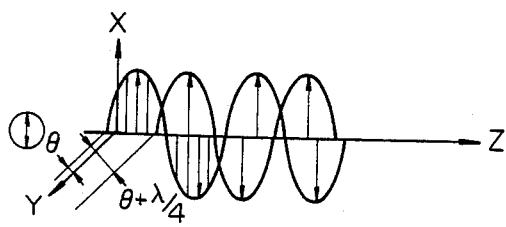
Fig.14(d)
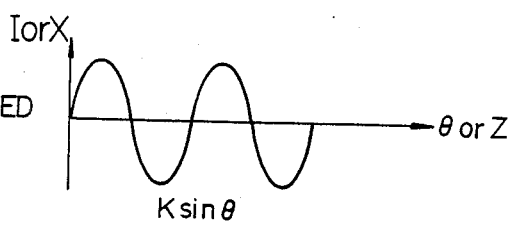
Fig.14(e) DETECTED SIGNAL

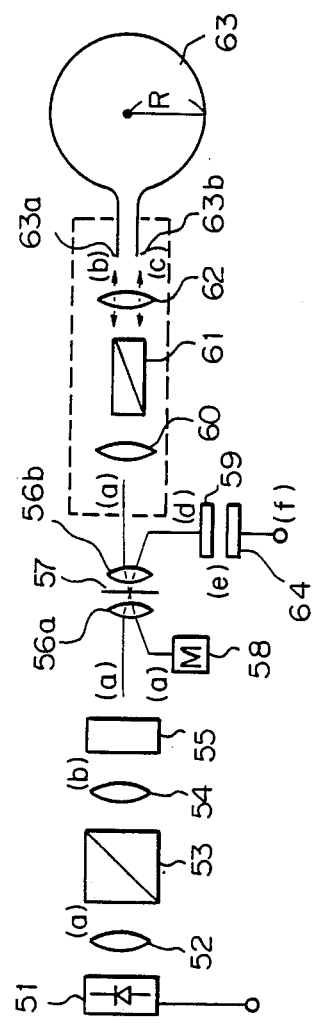

Fig.22(e) DETECTED SIGNAL 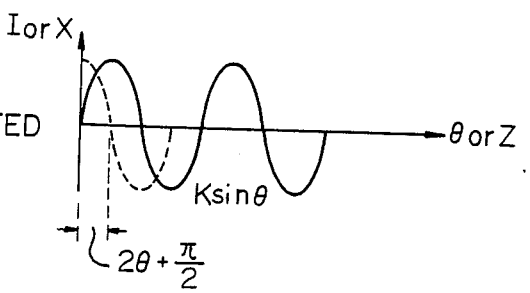

Fig. 29
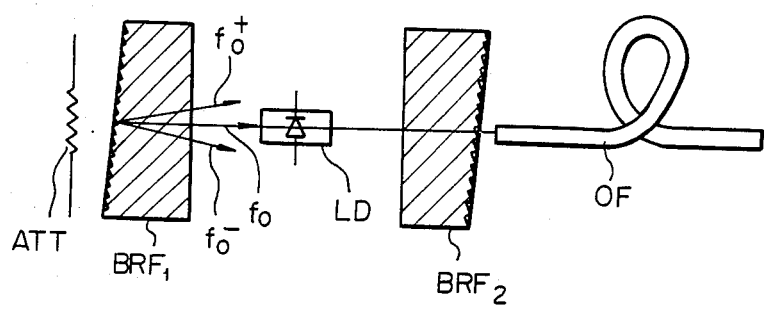
Fig. 30
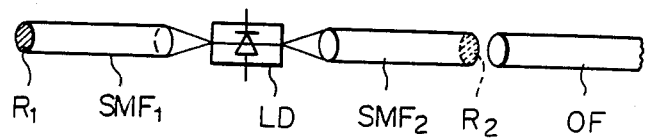
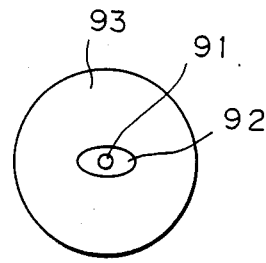
Fig. 31(a)
PRIOR ART
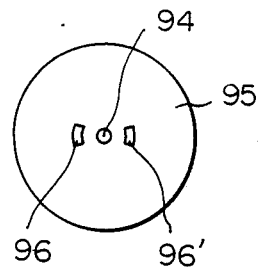
Fig. 31(b)
PRIOR ART

FIBER-OPTIC GYRO

BACKGROUND OF THE INVENTION

The present invention relates to a fiber-optic gyro for use in detecting the posture of airplanes, space vehicles, and the like.

Known in the art is a fiber-optic gyro utilizing the Sagnac effect. In this gyro a laser beam from a laser diode is applied to a polarization plate through a beam splitter. Light having a specific polarization plane emerges from the polarization plate to strike an optical fiber directional coupler.

The coupling degree in the optical-fiber directional couplers, however, depends greatly on the polarization plane. The optical fiber directional coupler must therefore be designed in accordance with the polarization plate used so as to ensure the optimum coupling degree.

Even with a specially designed optical-fiber directional coupler, the optimum coupling degree may not be obtained due to the rotation of the polarization plane of the light due to terrestrial magnetism. To prevent this rotation, the light is converted to circularly polarized light by a depolarizer.

The polarization plate, depolarizer, and other related components increase the size and complexity of the gyro.

Also known in the art is a fiber optic gyro using a Rochon prism. A Rochon prism, however, is not always appropriate for branching and synthesis of polarized light between input and output optical fibers. To increase the efficiency of coupling between optical fibers, a special optical fiber therefore becomes necessary. Also, the end faces of the Rochon prism and the optical fibers are usually arranged perpendicularly to the optical path. Therefore, some incident light is reflected and returns to the light source to cause interference. Ordinarily, this return loss is about 14 dB per end face. Even if a non-reflective coating is applied, the return loss is only reduced to about 25 dB. Of course, the greater the number of the reflected faces in the optical path, the greater the return loss. Therefore, when utilizing a Rochon prism, it is impossible to control the return loss to a sufficiently low level.

The customarily used optical fiber has a circular section. Therefore, formation of different polarized components based on micro-bends or convexities and concavities on the boundary face of the core cannot be avoided. These different polarized components are produced by return light reflected on a reflecting face having a large return loss, resulting in cross-talk. In the conventional system, since the return loss is large, it is impossible to sufficiently reduce the cross-talk loss.

As a means for holding an optical fiber, there is known a method in which an optical fiber is held in a V-shaped groove extending in a certain direction, which is formed on a silicon substrate by etching. In the conventional system, since it is impossible to make both the output lights parallel to the input light, it is not permissible to utilize a V-shaped groove formed on a silicon substrate for holding the optical fiber. Therefore, the structure of the apparatus becomes complicated and increase of the size of the apparatus cannot be avoided.

SUMMARY OF THE INVENTION

An object of the present invention is to provide a fiber-optic gyro with an optical fiber directional coupler having the best coupling degree.

Another object of the present invention is to provide a fiber-optic gyro which can be formed by a small number of constituent elements.

A further object of the present invention is to provide a fiber-optic gyro in which branching and synthesis of polarized light can be accomplished between input and output fibers with reduced loss, return loss and cross-talk, wherein the structure and size of the apparatus can be simplified and minimized.

The above mentioned objects can be achieved by a fiber-optic gyro comprising a laser diode, a light detector, first and second lenses arranged on both sides of a half mirror, and a coil-like optical fiber which is arranged so that the two ends of the optical fiber confront the first and second lenses. The light beam (i.e., wave) from the laser diode is incident on the half mirror through the first lens. The beam reflected from the half mirror is incident on one end of the coil-like optical fiber through the first lens. The light beam transmitted through the half mirror is incident on the other end of the coil-like optical fiber through the second lens. Thus, light beams are propagated through the coil-like optical fiber in two opposing directions. The light beams from the coil-like optical fiber are synthesized and made to be incident on the light detector. The speed of change of the rotation angle is detected by the output of the light detector.

The above-mentioned objects may also be achieved by a fiber-optic gyro comprising a half mirror having a dielectric multilayer film formed on one surface of an optical substrate, first and second optical fibers each having one end aligned with each other, with the half mirror interposed between these ends, and a single-mode fiber having the property of maintaining the polarization-plane and forming a fiber loop. The single-mode fiber is arranged so that its ends are parallel to the first and second fibers, with the half mirror interposed between the ends of the single-mode fiber. The faces of one end of each of the first and second fibers and both the ends of the single-mode fiber are tilted with respect to the optical axes of the optical fiber. A single-mode laser beam of a certain polarization is incident from the other end of the first optical fiber. The laser beam emerging from the respective end of the first optical fiber is divided in two beams by the half mirror. The two light beams are incident on the respective ends of the singlemode fiber and propagate through the single-mode fiber in opposite directions. The light beams emerging from the ends of the single-mode fiber are synthesized and incident on the respective end of the second optical fiber. The laser beam emerging from the other end of the second optical fiber is detected by a light detector.

Still further, the above-mentioned objects can be achieved by a fiber-optic gyro which comprises a Rochon prism having the same tilt angle $\alpha 1$ on the incident and emergent end faces, an input optical fiber having an optical axis parallel to the mechanical axis of the Rochon prism and a tilt angle $\theta p$ on the emergent end face arranged at a point separated by a distance h from the mechanical axis, a first lens having a focal distance F, which is interposed between the input optical fiber and the Rochon prism and has a center at a point separated by a distance I1 from the incident end face of the Rochon prism on the mechanical axis of the Rochon prism. The polarization-maintaining axis of each of the two output fibers are arranged orthogonally. These fibers are consituted by both ends of a fiber coil. In the coil, only single-mode, linearly polarized light beams propagate in both directions with respect to a single axis of polarization of the fiber. Two output optical fibers arranged at points separated by a distance h from an axis parallel to the mechanical axis passing through the equivalent light branching point of the Rochon prism and having tilt angles of $\theta p$ and $-\theta p$ on the incident end faces thereof, and a second lens having a focal distance F, which is interposed between both the optical fibers and the Rochon prism and has the center on an axis parallel to the mechanical axis of the Rochon prism and separated by a distance I1 (same as $\alpha_1$ in FIG. 20) from the equivalent light branching point. The tilt angle $\alpha 1$ of the Rochon prism, the emergent angle $\theta o$ of the input optical fiber, the incident angle $\theta r$ of the output optical fiber, and the focal distance F of both the lenses are determined by the following relations:

$$\alpha_1 = \left( \frac{+n_e}{n_e + n_o - 2} \right) \cdot \delta$$

$$\theta o = \theta r = \sin^{-1}((n_c/n_a) \sin \theta p) - \theta p, \text{ and}$$

$$\theta o = \theta r = (I_1 - F)h/F^2$$

wherein $n_e$ represents a refractive index of the Rochon prism for abnormal light, $n_o$ represents a refractive index of the Rochon prism for normal light, $\delta$ stands for a separation angle in the Rochon prism for abnormal and normal light, $n_c$ stands for the refractive index of the inlet and outlet optical fiber cores, and $n_a$ stands for the refractive index of air.

Still further, the above-mentioned objects can be achieved by providing a fiber-optic gyro comprising: a light source of a circularly polarized wave; a light branching and synthesizing device having an optical fiber loop composed of a polarization-plane storing fiber, four terminals, and a half mirror; and a light detector. Circularly polarized light incident from the first terminal is separated by the half mirror into two linearly polarized light beams having polarization planes crossing at right angles. The linearly polarized light beams emerge from the second and third terminals connected to both ends of the optical fiber loop. The light beams propagating through the optical fiber loop in opposite directions are synthesized by the half mirror and emerge from the fourth terminal. The output light from the fourth terminal is detected through a Babinet compensator phase plate.

Still further, the above-mentioned objects can be achieved by providing a fiber-optic gyro comprising: a laser oscillator; a polarization-plane converting optical system for converting the output of the laser oscillator to linearly polarized light and then to circularly polarized light; a light branching and synthesizing device having an optical fiber loop composed of a polarization-plane-maintaining fiber, four terminals, and a half mirror; a phase modulator; a light detector; and a phase detector. The laser oscillator is phase-modulated by the phase modulator. The output of the polarization-plane converting optical system is input in the first terminal, is separated by the half mirror into two linearly polarized light beams crossing at right emerge from the second and third terminals respectively connected to the ends of the optical fiber loop. The light beams propagated through the optical fiber loop in opposite directions and are synthesized by the half mirror and emerge from the fourth terminal. The output light from the fourth terminal is detected by the light detector. The output of the light detector is input to the phase detector to effect phase detection to determine the phase difference between the light beams propagated through the optical fiber loop in opposite directions.

Further features and advantages of the present invention will be apparent from the ensuing description with reference to the accompanying drawings, in which, however, the scope of the present invention is in no way limited.

BRIEF DESCRIPTION OF THE DRAWINGS

FIG. 12 is a diagram of a modification of the second embodiment of the present invention;

FIGS. 14(a) to (e) are diagrams of polarization states of light at parts in the diagram of FIG. 13;

FIGS. 15(a) to (e) are time charts of the operations in the diagram shown in FIG. 13;

FIG. 21 is a diagram of modification of the fourth embodiment of the fiberoptic gyro according to the present invention;

FIGS. 22(a) to (e) are diagrams of the polarization states at parts in the embodiment shown in FIG. 21;

FIG. 29 is a diagram of a preferred light source portion used in the present invention;

FIG. 30 is a diagram of another preferred light source portion used in the present invention;

FIGS. 31(a) and (b) show two examples of conventional polarization-plane storing optical fibers;

FIGS. 32A, 32B, 32C show a preferred polarization-plane storing optical fiber used in the present invention, in which FIG. 32A is a diagram of a section of the fiber, FIG. 32B is a block diagram of the structure for measuring the polarization-plane storing characteristic, and FIG. 32C is a curve of the polarization-plane storing characteristics of the fiber.

DESCRIPTION OF THE PREFERRED EMBODIMENTS

Figure 1:
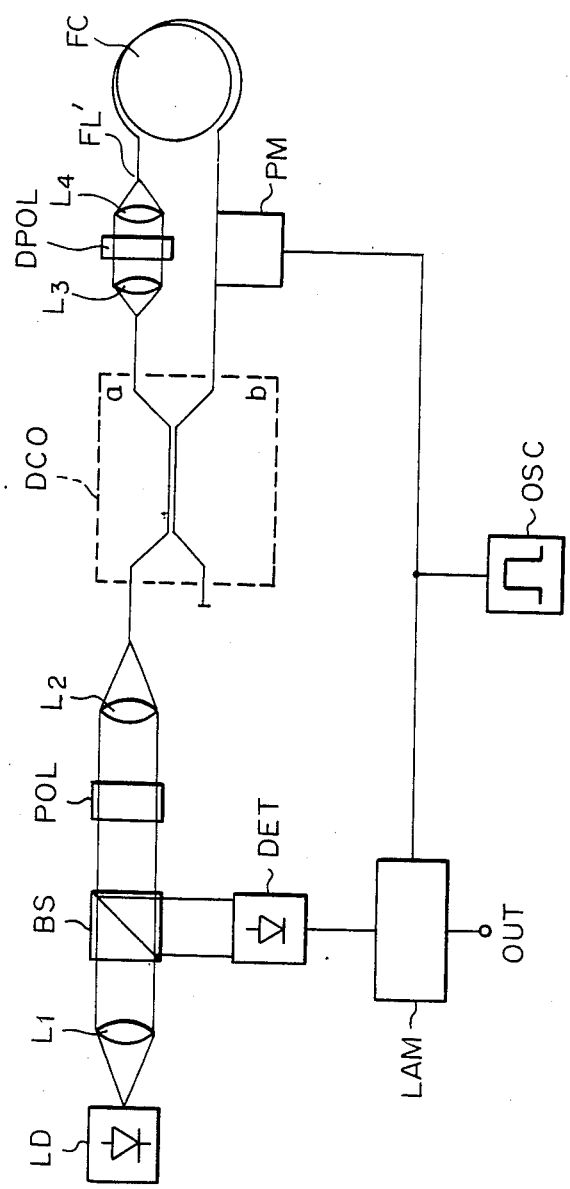
FIG. 1 is a diagram of a conventional fiber-optic gyro.

Before describing the preferred embodiments, an explanation will be given of a conventional fiber-optic gyro scope utilizing the Sagnac effect. As shown in FIG. 1, in this gyroscope, a laser beam from a laser diode LD is applied to a polarization plate POL through a beam splitter BS. Only the light having a specific polarization plane emerges from the polarization plate to strike an optical fiber directional coupler DCO.

The optical fiber directional coupler DCO divides the incident laser beam by 3 dB and causes the divided beams to emerge on points a and b. The laser beam emerging at the point a is depolarized by a depolarizer DPOL and is incident on an optical fiber coil FC at the end face FL' thereof. On the other hand, the light emerging on the point b is modulated by a light modulator PM for a λ/4 phase shift before being incident on an optical fiber loop FC.

The laser beams thus transmitted through the optical fiber coil FC in directions opposite to each other are incident on the optical fiber directional coupler DCO again, synthesized there, and become incident on the polarization plate POL.

Only a laser beam having a specific polarization plane emerges from the polarization plate POL again to strike the beam splitter BS and be reflected therefrom. The reflected laser beam is incident on a light detector DET.

An electric signal from the light detector DET is input in a lock-in amplifier LAM where the gate is opened to effect amplification only when the light returns from the optical fiber core FC, whereby the signal-to-noise (S/N) ratio is improved.

The light beams transmitted through the optical fiber in the clockwise direction and the counterclockwise direction, respectively, are phase-shifted by the Sagnac effect and are expressed as $\cos(\omega t + \theta)$ and $\cos(\omega t - \theta)$, respectively.

These two laser beams are synthesized, that is, combined. The detected intensity of the combined laser beam is proportional to $\cos\theta$.

$$\cos(\omega t + \theta) + \cos(\omega t - \theta) = 2\sin\omega t \cdot \cos\theta$$

Accordingly, if the value of $\cos\theta$ is found, the speed of the change of the rotation angle can be detected.

However, if the value of $\cos\theta$ is employed, its sign is the same for $+\theta$, irrespective of the direction of rotation. Thus, the rotation direction cannot be known.

Accordingly, the phase of the light transmitted in the counterclockwise direction is shifted by $\pi/2$ by the light modulator PM.

Therefore, the light transmitted in the counterclockwise direction is expressed as $\cos(\omega t - \theta + \pi/2)$ and the detected intensity of the combined light is proportional to $\sin\theta$.

The sign of the value of $\sin\theta$ is reversed if $\theta$ is, and hence, the rotation direction can be known.

Since the coupling degree in the optical fiber directional coupler DCO depends greatly on the polarization plane, it is necessary that the optical fiber directional coupler be designed in accordance with the polarization plate POL so that an optimum coupling degree can be obtained. Even with a specially designed optical fiber directional coupler, the optimum coupling degree may not be obtained due to the rotation of the polarization plane of the light which returns from the optical fiber coil FC due to terrestrial magnestism. Accordingly, the above light is converted to circularly polarized light by a depolarizer DPOL.

Figure 2:
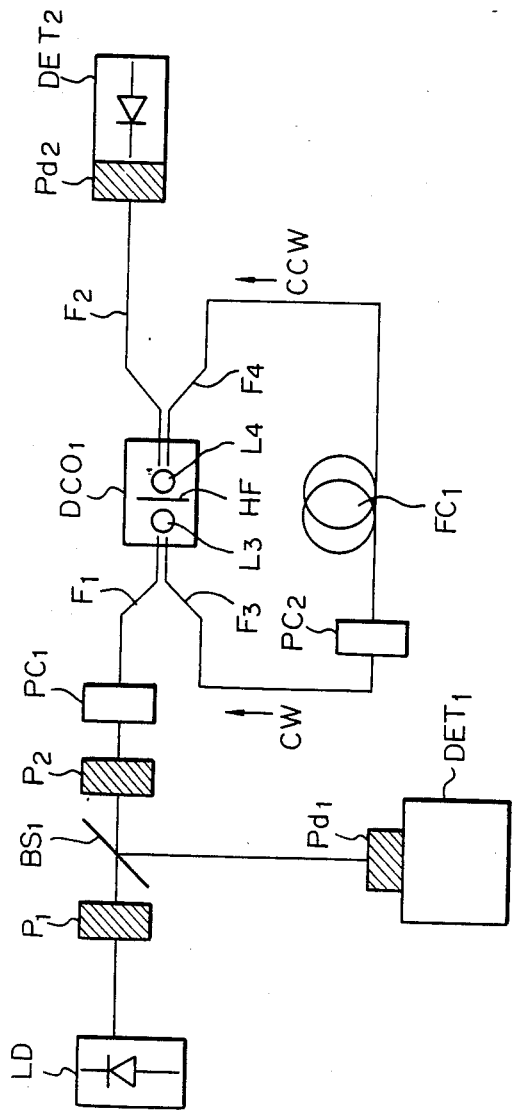
FIG. 2 is a diagram of a first embodiment of a fiber-optic gyro according to the present invention.
Figure 3:
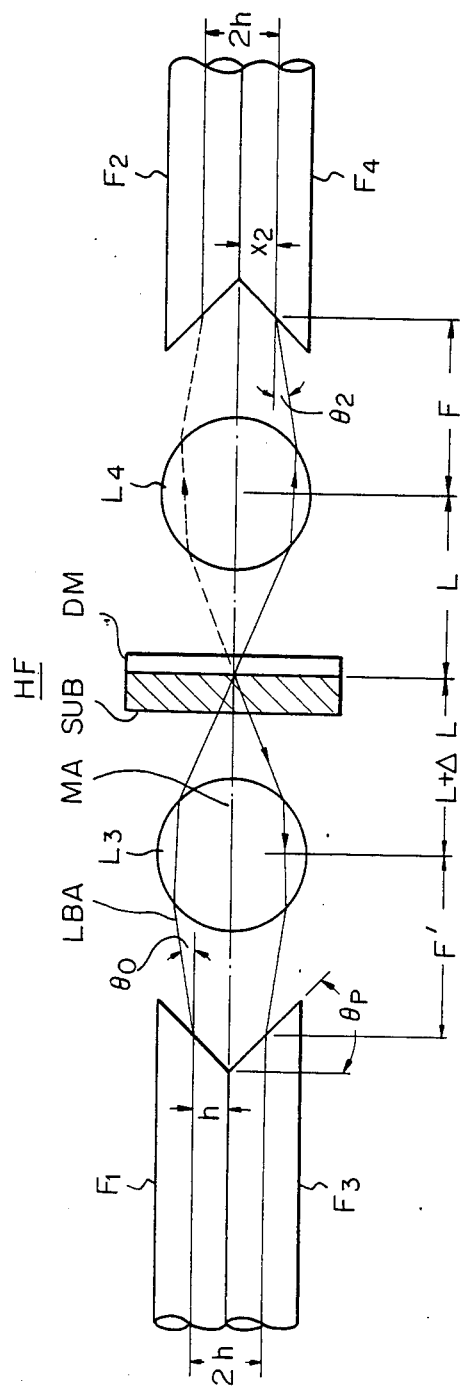
FIG. 3 is a diagram of an optical fiber directional coupler used in the present invention.

FIGS. 2 and 3 show an embodiment of the present invention and an optical fiber directional coupler used in the present invention. In FIGS. 2 and 3, the same member as shown in FIG. 1 are represented by the same symbols. P1 and P2 represent polarizers, PC1 and PC2 control portions for the polarization plane, Pd1 and Pd2 polarized-light separating prisms, DET1 and DET2 light detectors, L3 and L4 are ball lenses, DCO1 optical fiber directional coupler, FC1 an optical fiber coil, and HF a half mirror.

In the present invention, in order to shift the phase of the light transmitted in the counterclockwise direction CCW by "$\pi$" without using a light modulator, the lenses L3 and L4 of the optical fiber directional coupler DCO1 are formed by using a crystal having a single-axis characteristic, such as sapphire.

The control portions PC1 and PC2 for the polarization plane are formed to effect fine adjustment of the quantity of this phase shift. The polarization plane is rotated in these control portions.

More specifically, the optical fiber is twisted in the control portions PC1 and PC2.

The operation of the fiber-optic gyro shown in FIG. 2 will now be outlined.

Referring to FIG. 2, the optical fiber directional coupler DCO1 has a structure in which four single-mode fibers are connected by two ball lenses L3 and L4 and the half mirror HF is inserted between the lenses L3 and L4.

A linearly mode polarized light beam from the laser diode LD (single mode) is provided from the optical fiber F1 of the optical fiber directional coupler DCO1 to be incident on the half mirror HF through the ball lens L3.

In the half mirror HF, the incident light is divided into the reflected light beams and the transmitted light. The reflected light passes through the ball lens L3 again and is incident on the end face F3 of the optical fiber coil FC1. The transmitted light passes through the ball lens L4 and is incident on the end face F4 of the optical fiber coil FC1.

The lights transmitted through the optical fiber coil FC1 in the clockwise direction CW and the counterclockwise direction CCW undergo phase shifts $\pm\phi$ proportional to the rotation angle speed $\Omega$ of the optical fiber coil FC1, respectively. The phase shift $\phi$ is expressed by formula (1) according to the Sagnac equation:

$$\pm\phi = \pm|2\pi Rl\cdot\Omega/(\lambda c)| \tag{1}$$

wherein R represents the radius of the coil, l stands for the fiber length, c stands for the speed of light in vacuum, and $\lambda$ represents the wavelength of the light wave in vacuum.

In the above formula, the signs "+" and "−" correspond to phase deviations of the light transmitted in the counterclockwise direction CCW and the light transmitted clockwise direction CW, respectively. These two light beams are synthesized in the half mirror HF and divided again as described above. One light beam is returned to the optical fiber F1 and is incident on the light detector DET1 through the beam splitter. The other light beam is incident on the optical fiber F2 and guided to the light detector DET2.

The optical fiber directional coupler DCO1 will now be described with reference to FIG. 3. The structure of this directional coupler was described by us in the publication entitled "Single-Mode Fiber-Optic Directional Coupler" in Applied Optics, Vol. 21, No. 19, October 1982.

Ordinarily, in a directional coupler, when reflected light beams leaking from the optical surfaces of the lens, fiber, or a half-mirror, or returning lights couple with the optical fiber again, light phase noise is generated. Accordingly, in the directional coupler shown in FIG. 3, the optical axis LBA is separated from the mechanical axis MA and tilted therefrom. The end face of the optical fiber has a tilt angle $\theta$p with respect to the mechanical axis.

In this optical fiber directional coupler DCO1, the distance F' between the lens $L_3$ and fiber and the distance L between the lens $L_4$ and half mirror HF are changed so that an optimum coupling efficiency can be obtained among the four fibers. For example, when the structural parameters of the four fibers are the same, the optimum coupling efficiency can be obtained if the following equations (2) and (3) are established, and adjustment can be made so that these conditions are satisfied:

$$\theta_0 = \theta_2 = (L-F)/F \tag{2}$$

$$x_2 = -h \tag{3}$$

wherein F stands for the focal distance of the lens, $\theta_0$ stands for the emergent angle, $\theta_2$ stands for the incident angle, and $x_2$ and h represent half values of the distance between the centers of the fiber cores.

The light waves transmitted in the optical fiber directional coupler DCO in the two directions are substantially limited to those satisfying the conditions of equations (2) and (3). Accordingly, the light path in DCO1 and the light-incident position to the half mirror are fixed. Almost no deviation of the optical path is caused between the light waves propagated in the two directions. In FIG. 3, SUB denotes a substrate and DM denotes a multilayer dielectric film.

The condition for providing a $\pi/2$ light phase bias between light waves CCW and CW in the fiber gyroscope shown in FIG. 2 and the quantity of the light phase noise produced at this time will now be clarified.

Assuming that a linear polarized light wave is used as the light source, the electric field is expressed by the following equation according to the complex vector system:

$$|E = (\exp(-i\omega t))\,(|E_{ox}\cdot e^{\phi x}) \tag{4}$$

wherein $|E_{ox}$ stands for the rector of the light, $\omega$ stands for the angular speed of the light wave, and $\phi x$ designates the phase of the light wave.

In the optical fiber directional coupler shown in FIG. 3, in the case where a lens formed of a monoaxial crystal such as sapphire is used, a phase deviation $2\theta k$ of the light wave is caused between normal light and abnormal light. Assuming that the angle between the axis of the incident light wave and the crystal axis is $\alpha_k$, the light wave passing through this lens undergoes a phase shift $(T_k)$ represented by the following equation:

$$(T_k) = \begin{matrix} e^{i\theta K}\cos^2\alpha_K + e^{-i\theta K}\cos\alpha_K, \\ -2i\sin\theta_K \sin\alpha_K \cos\alpha_K, \\ -2i\sin\theta_K \sin\alpha_K \cos\alpha_K \\ e^{i\theta K}\sin^2\alpha_K + e^{-i\theta K}\cos^2\alpha_K \end{matrix} \tag{5}$$

where K is 1, 2, or 3, for which, in the case of K=1, the value between F1 and HF in lens 3 is indicated, in the case of K=2, the value between F4 and DM in lens 4 is indicated, and in case of K=3, the value between F3 and HF in lens L3 is indicated.

In an ordinary single-mode fiber, propagation of the light wave leads to rotation of the polarization plane thereof, and, simultaneously, conversion of the light wave to ovally polarized light. However, the fiber can be twisted to return it to linearly polarized light again. If this fact is taken into consideration, the change $(T_F)$ of the light wave propagated through the coil can be expressed by the following equation by using the rotation $\alpha_F$ of the polarization plane:

$$(T_F) = \begin{pmatrix} \cos\alpha_F & -\sin\alpha_F \\ \sin\alpha_F & \cos\alpha_F \end{pmatrix} \tag{6}$$

In the case of a linearly polarized wave store fiber, a relation of $\alpha_F = 0$ is established in equation (6). However, equation (6) is established if the incident or emergent end face (F3 or F4 in FIG. 2) of the fiber coil FC to the lens L3 or L4 is rotated by $\alpha_F$.

Firstly, the case wherein the polarizer P2 (see FIG. 2) is not provided is examined. The light wave from the fiber coil FC is incident on the light detector DET1 through the half-mirror HF. Electric field vectors $|E_{ccw}$ and $|E_{cw}$ of the light waves CCW and CW are expressed as follows by using the equations (1), (4), (5), and (6):

$$|E_{ccw} = \frac{1}{\sqrt{2}}\,(T_1)^t(T_2)^t(T_F)(T_3)^t(T_1)\cdot\begin{pmatrix} E_{ox}\cdot\cos\beta \\ E_{ox}\cdot\sin\beta \end{pmatrix}e^{j\phi} \tag{7}$$

$$|E_{cw} = \frac{1}{\sqrt{2}}\,(T_1)^t(T_3)(T_F)^t(T_2)(T_1)\cdot\begin{pmatrix} E_{ox}\cdot\cos\beta \\ E_{ox}\cdot\sin\beta \end{pmatrix}e^{-j\phi} \tag{8}$$

Incidentally, the following relation is established.

$$|E_{ox} = E_{ox}e^{-j(\omega t - \phi x)} \quad (9)$$

In equation (4), the angle of rotation of the polarization plane caused by rotation or twisting of the fiber F1 at the point where the linearly polarized light wave is incident on the lens L3 from the fiber F1 is designated as $\beta$.

From equation (5), the following equation is derived:

$$(T_K) = (T_K)^t \quad (10)$$

wherein K is 1, 2, or 3. Accordingly, the electric field $|E$ formed by synthesis of the lights CCW and CW is expressed as follows:

$$|E_T = |E_{CCW} + |E_{CW} \quad (11)$$

This $|E$ can be expressed by the following simple equation by using equations (1) and (4) through (11):

$$|E_T = \frac{1}{\sqrt{2}} \quad (12)$$

$$\begin{pmatrix} (f_1\cos\beta + f_2\sin\beta)e^{i\phi} + (f_1\cos\beta - f_2{}^*\sin\beta)e^{-i\phi} \\ (f_1{}^*\sin\beta - f_2{}^*\cos\beta)e^{i\phi} + (f_1{}^*\sin\beta + f_2\cos\beta)e^{-i\phi} \end{pmatrix} |E_{ox}$$

Incidentally, $f_1$ and $f_2$ in the above equation are represented as follows:

$$\begin{pmatrix} f_1 f_2 \\ f_3 f_4 \end{pmatrix} = (T_1)^t(T_2)^t(T)_F(T_3)^t(T_1) \quad (13)$$

It is proved from equation (13) that the following relations are established:

$$f_4 = f_1{}^* \quad (14)$$

$$f_3 = -f_2{}^* \quad (15)$$

The electric output I1 obtained when $|E_T$ is incident on the light detector DET1 is given by the following equation by using equation (12) in the case where an X-polarized light wave is taken out:

$$I_1x = <||E_{TX}|^2> = \quad (16)$$

$$\tfrac{1}{2}\{|f_1\cos\beta + f_2\sin\beta|^2 + |f_1\cos\beta - f_2{}^*\sin\beta|^2 + (f_1\cos\beta + f_2\sin\beta)$$

$$(f_1\cos\beta - f_2{}^*\sin\beta)^*e^{2i\phi} + (f_1\cos\beta + f_2\sin\beta)^*$$

$$(f_1\cos\beta - f_2\sin\beta)e^{-2i\phi}\} \cdot ||E_{ox}|^2$$

Each of $f_1$ and $f_2$ is a function of $\alpha_F$, and the complex amplitude thereof is changed according to $\alpha_F$. Similarly, by changing $\beta$, the complex amplitude of each element of (f1 cos $\beta$ + f2 sin $\beta$) of equation (16) can be changed. Thus, the phase difference component $\Delta\phi x$ can be adjusted by adjusting $\alpha_F$ or $\beta$. By using equation (12), the above component in the polarization direction X is expressed as follows:

$$\Delta\phi x = \arg(f_1\cos\beta + f_2\sin\beta) - \arg(f_1\cos\beta - f_2{}^*\sin\beta) = \pm\frac{\pi}{2} \quad (17)$$

This $\Delta\phi x$ indicates an optical light phase bias condition.

By using equation (12), the electric output I1y obtained in DET1 by the light wave polarized in the direction y is similarly expressed by an equation similar to equation (16). Furthermore, by adjusting $\alpha_F$ or $\beta$ with respect to the light wave polarized in the direction y, the phase difference component $\Delta\phi y$ can be adjusted to an optimum value, as indicated by the following formula (18) which is similar to equation (17):

$$\Delta\phi y = \arg(f_1{}^*\sin\beta - f_2\cos\beta) - \arg(f_1{}^*\sin\beta + f_2\cos\beta) = \mp\frac{\pi}{2} \quad (18)$$

Incidentally, in equation (16), the absolute value of the term multiplied by $e^{2i\phi}$ is equal to the absolute value of the term multiplied by $e^{-2i\phi}$. This is also true with respect to $I_1y$. Accordingly, the following relations are established in the detection outputs $I_1x$ and $I_1y$ of the fiber optic gyro:

$$I_1x \text{ is proportional to } \pm\sin 2\phi \quad (19)$$

and $$I_1y \text{ is proportional to } \mp\sin 2\phi \quad (20)$$

As is apparent from equations (17) and (18), there are present values of $\alpha_F$ and $\beta$ simultaneously satisfying the conditions of equations (17) and (18). In this case, in FIG. 2, insertion of the polarizer P2 is not allowed. Instead, a polarized-light separating prism Pd1 is inserted just before the light detector DET1, whereby $I_1x$ and $I_1y$ can be taken out as the detection outputs.

When I1x and I1y are simultaneously used, similar phase noises can be removed. Incidentally, leakage due to imperfections of the polarized-light separating prism Pd1 results in reduction of the electric output, not increase of phase noises.

In the case where a simpler optical system is used, the polarizer P2 is inserted, and one of $I_1x$ or $I_1y$ is taken out. It has been reported that in this case, the light phase noise of the fiber-optic gyro can be controlled to a minimum level. In the fiber-optic gyro proposed in the present invention, as is apparent from equations (16) through (20), the light phase noise can theoretically be reduced to zero.

The foregoing illustration has been made with reference to the light wave output from the light detector DET1. However, according to substantially similar procedures, the output I2 of the light detector DET2 can be determined. In this case, tendencies similar to those described above are observed also with respect to I2x and I2y, but the light phase noise cannot be reduced to zero.

Figure 4A:
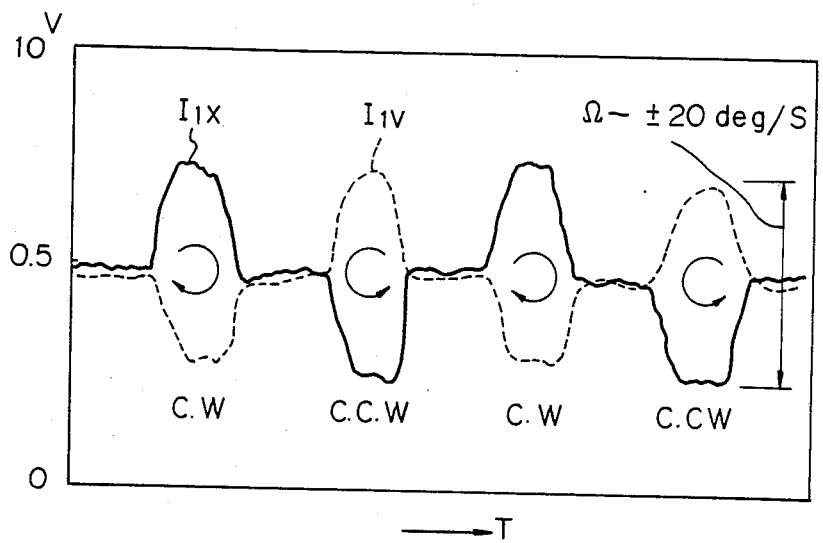
FIGS. 4A and 4B are diagrams of the effects of the gyro of the present invention.
Figure 4B:
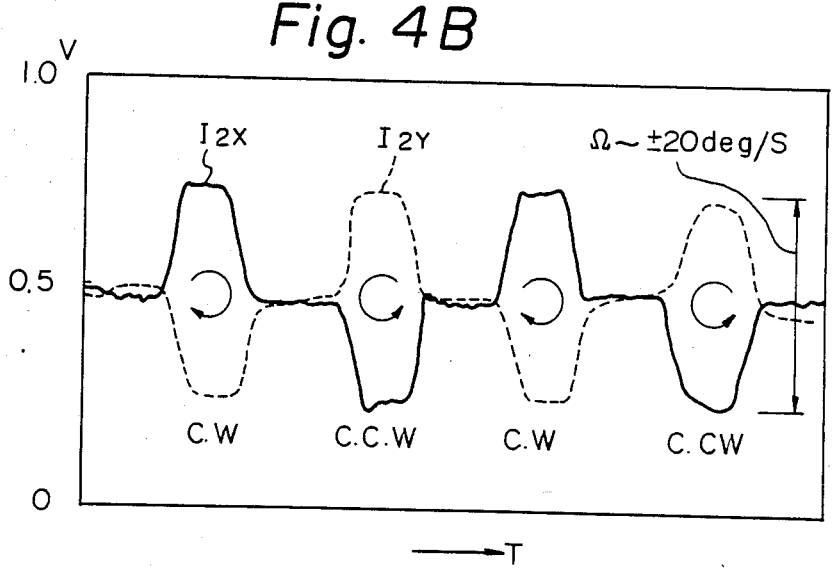

The results of experiments made by using the fiber optical gyro shown in FIG. 2 are shown in FIGS. 4A and 4B. In the structure shown in FIG. 2, the polarizer P1 is inserted, and the voltage of the light detector DET1 is read by a voltage meter and recovered by a X-T recorder. The obtained results are shown in FIG. 4A. Waveforms Ix and Iy of output voltages of Pd1 shown in FIG. 2 are shown in FIG. 4B, which are obtained in experiments where the polarizer P2 is inserted. In FIGS. 4A and 4B, the abscissa indicates the time T and the ordinate the output voltage V. CW indicates the results obtained when rotation in the clockwise direction is detected, and CCW indicates the results obtained when rotation in the counterclockwise direction is detected.

From the foregoing results, it is confirmed that the relations of equations (11) and (20) are established substantially simultaneously. By making such adjustment as twisting of the fiber by PC1 and PC2 shown in FIG. 2 at this time, $\beta$ and $\alpha_F$ are changed and the phase bias of the light wave can be adjusted to an optimum value, namely $\pm\pi/2$. Accordingly, it also is clarified that equations (17) and (18) can be simultaneously established. Since it is generally considered that a fiber-optic gyro can be realized if one of equations (19) and (20) is established, it is believed that the above results are satisfactory.

Figure 6:
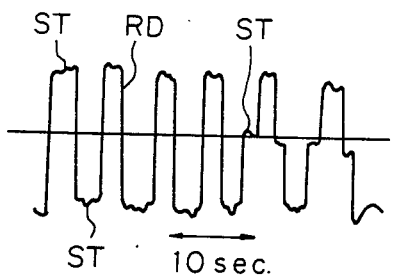
FIG. 6 is a diagram of an example of the rate of change of detection of the rotation angle.
Figure 7:
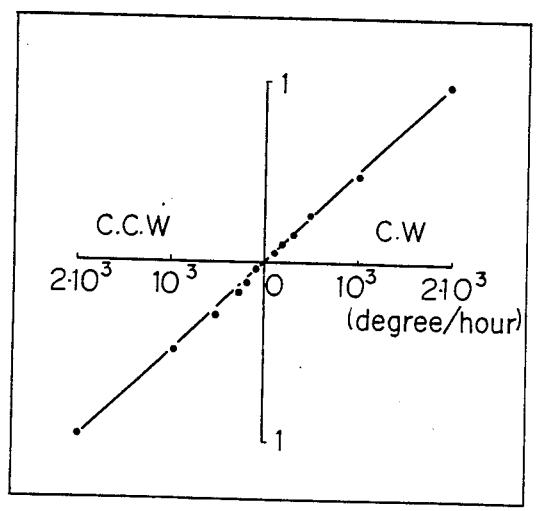
FIG. 7 is a diagram of the linearity and symmetry of the sensitivity of the fiber-optic gyro.

The results of experiments where the laser diode is pulse-modulated and synchronous detection is carried out, by using the optical system shown in FIG. 2 in a circuit as shown in 5A, are shown in FIGS. 6, 7, and 8.

Figure 5A:
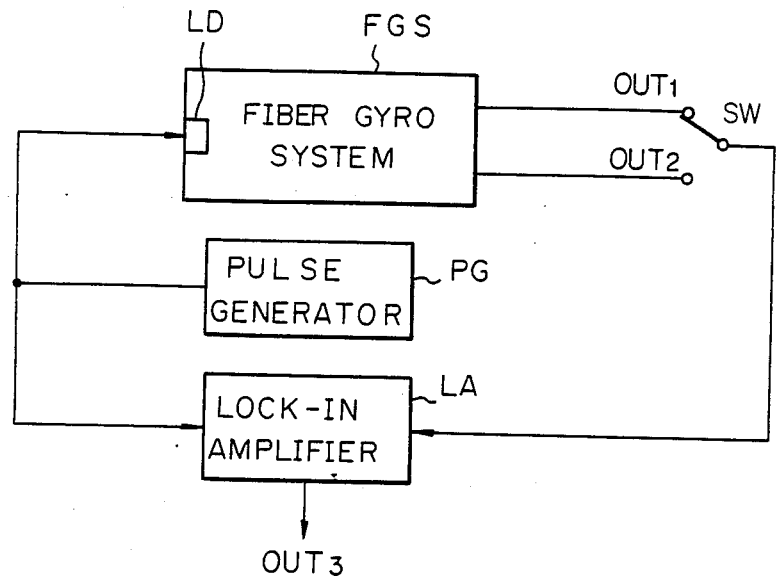
FIGS. 5A and 5B (a) to (c) are a diagram of an experimental apparatus including the fiber-optic gyro of the present invention and time charts thereof.

In FIG. 5A, FGS represents the fiber-optic gyro system shown in FIG. 2, FG stands for a pulse generator, LA represents a lock-in amplifier, and SW represents a switch.

Figure 5B:
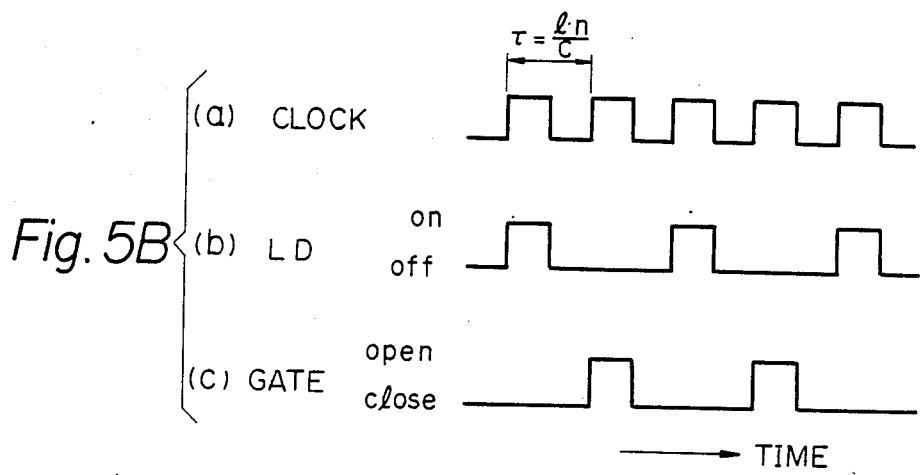

A clock shown in FIG. 5B-(a) is output from the pulse generator PG. A clock shown in FIG. 5B-(b) is input into the laser diode LD. A clock shown in FIG. 5B-(c) is input into the lock-in amplifier LA.

The frequency $\tau$ of the clock of FIG. 5B(a) is determined by the relation of $\tau = l \cdot n/c$ in which l stands for the length of the fiber coil, n stands for refractive index of the fiber core, and c stands for the speed of light in vacuum.

The value of $\tau$ indicates the time required for the laser beam from the laser diode to pass through the fiber coil and to be guided to the light detector DET1 or DET2. By closing the gate of the lock-in amplifier before the incidence of the light on the light detector, the noise component contained in the output OUT3 of the lock-in amplifier LA is removed.

The measurement results are now described. FIG. 6 illustrates results obtained when the fiber-optic gyro is placed on a rotary table and a rotation angle speed of $\pm 500°$/hour is given to the gyro. In FIG. 6, ST represents the output obtained when the rotation is stopped, and RD stands for the output obtained when the rotation is initiated.

FIG. 7 is a diagram of the linearity of the sensitivity of the fiber-optic gyro. In FIG. 7, the abscissa indicates the rotation angle speed (degree/hour) and the ordinate indicates the output voltage V. The region on the right side of the axis Y is the region where the gyro is rotated in the clockwise direction CW. The region on the left side of the axis Y is the region where the gyro is rotated in the counterclockwise direction CWC. As is apparent from FIG. 7, the results obtained with respect to rotations n in both the directions are symmetric. Good linearity is attained.

Figure 8A:
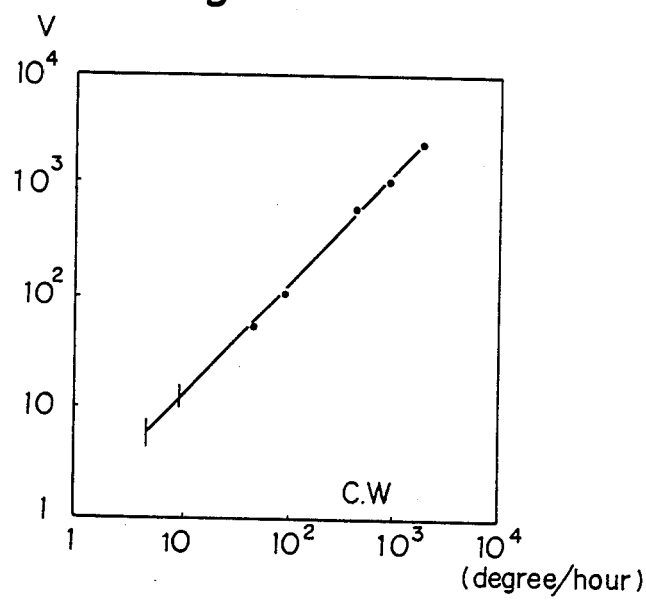
FIGS. 8A and B are diagrams of experimental results within the measuring range.
Figure 8B:
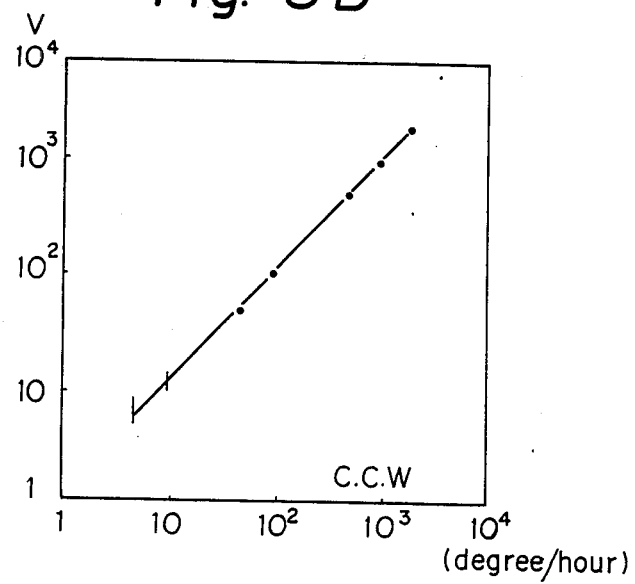

FIGS. 8A and 8B show results obtained when range of the rotation angle speed is broadened. The measurement is possible in the range of from 5° to 2000°/hour. Good linearity is attained. FIG. 8A shows the results obtained when the gyro is rotated in the clockwise direction CW, and FIG. 8B shows the results obtained when the gyro is rotated in the counterclockwise direction CCW.

In the foregoing experiments, a semiconductor laser VSB (1.3 μm wavelength) is used and a fiber coil of l=360 m and R=7 cm is used. The results shown in FIGS. 6 through 8B are those obtained without stabilization or temperature control of the laser diode, high frequency overlapping, or using a light isolator or polarizer P1, P2, Pd1 or Pd2. When the experiments are similarly performed by using 0.78 μm band laser diode (BCS-LD) as the light source, substantially similar results can be obtained.

Figure 9:
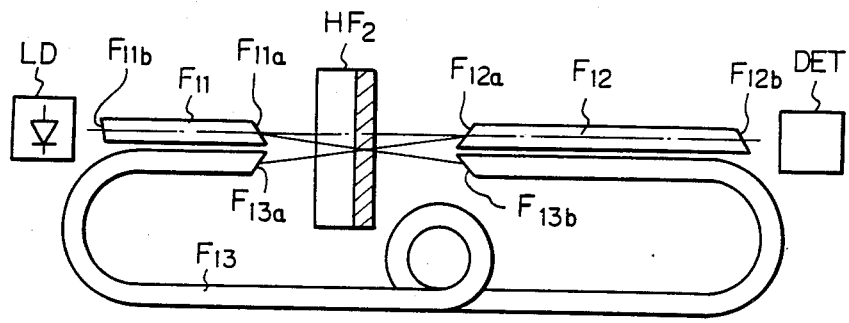
FIG. 9 is a diagram of a second embodiment of the fiber-optic gyro according to the present invention.

FIG. 9 is a diagram of a second embodiment of the present invention. In FIG. 9, $F_{11}$, $F_{12}$, and $F_{13}$ represent single-mode optical fibers including single-polarization-maintaining single mode optical fibers and $HF_2$ represents a half mirror. The same members as shown in FIG. 1D are represented with the same reference numerals. The optical fibers $F_{11}$ and $F_{12}$ are arranged with the half-mirror $HF_2$ interposed therebetween so that the optical axes of the optical fibers $F_{11}$ and $F_{12}$ extend along the same line.

The fiber $F_{13}$ forms an optical fiber loop. Both ends of the fiber $F_{13}$ are arranged in parallel to the optical fibers $F_{11}$ and $F_{12}$.

The optical fibers have a polarization-plane storing property, and the polarization plane of an incident laser beam is stored and emerges.

Figure 10:
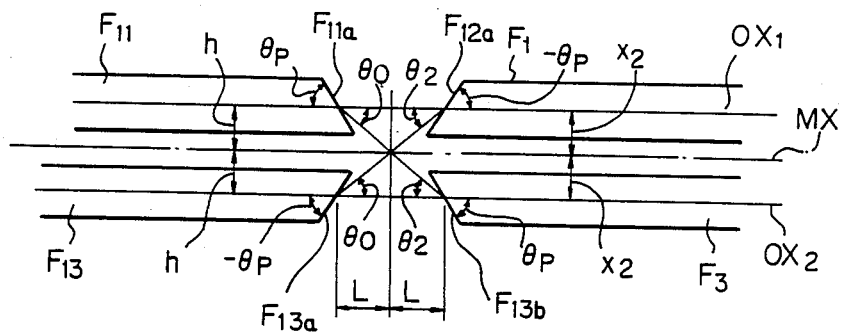
FIG. 10 is a diagram of an optical directional coupler used in the fiber-optic gyro shown in FIG. 9.

The end faces $F_{11a}$, $F_{12a}$, $F_{13a}$ and $F_{13b}$ of the optical fibers $F_{11}$, $F_{12}$ and $F_{13}$ are tilted by a certain angle, as shown in detail in FIG. 10.

Figure 11:
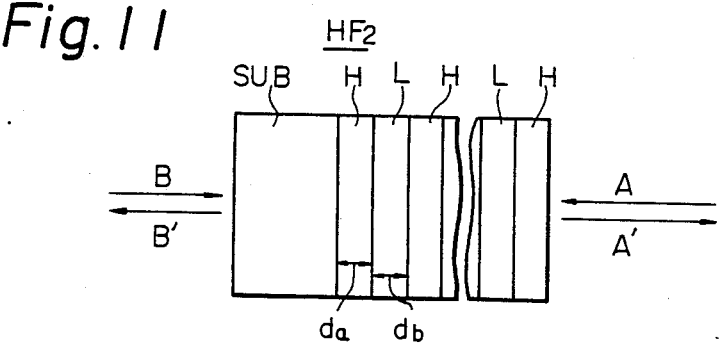
FIG. 11 is a diagram of a half-mirror used in the optical directional coupler shown in FIG. 10.

The half-mirror $HF_2$ comprises an optical substrate SUB and multilayer dielectric films H and L formed on the surface thereof as shown in FIG. 11.

The end faces $F_{11b}$ and $F_{12b}$ of the optical fibers $F_{11}$ and $F_{12}$ are inclined to form Brewster's angle with respect to the laser diode LD and the light detector DET.

In the present invention, the structure shown in FIG. 10 provides an optical directional coupler. A phase difference of $\pi$ is given by the half-mirror shown in FIG. 11 to laser beams propagated through the optical fiber loop in directions opposite to each other.

The tilt angle will now be described in detail with reference to FIG. 10. The tilt angle of the end faces $F_{11a}$ and $F_{13b}$ of the optical fibers with respect to the optical axes OX1 and OX2 is expressed as $\theta p$, and the tilt angle of the end faces $F_{12a}$ and $F_{13a}$ to the optical axes OX1 and OX2 is expressed as $-\theta p$. The incident or emergent angle of light with respect to the optical axis is expressed as $\theta o$, and the length between the incident or emergent point and the half-mirror is expressed as L. Assuming that the distance between the optical axes of the optical fibers $F_{11}$ and $F_{13}$ and the mechanical axis MX (passing through the light reflecting point of the half-mirror $HF_2$) is h, the incident angle $\theta 2$ and the distance x2 between the optical axes of the optical fibers $F_{12}$ and $F_{13}$ and the mechanical axis (passing through the light reflecting point of the half-mirror HF) are expressed by the ray matrix according to the following equation:

$$\begin{pmatrix} x_2 \\ \theta_2 \end{pmatrix} = \begin{pmatrix} 1 & L \\ 0 & 1 \end{pmatrix} \begin{pmatrix} 1 & L \\ 0 & 1 \end{pmatrix} \begin{pmatrix} h \\ \theta_0 \end{pmatrix}$$

$$= \begin{pmatrix} 1 & 2L \\ 0 & 1 \end{pmatrix} \begin{pmatrix} h \\ \theta_0 \end{pmatrix}$$

Accordingly, the following relations are established:

$x_2 = h + 2L \cdot \theta_0$ $\theta_2 = \theta_0$

In order to establish the relation of $x_2 = -h$, h is made equal to $L \cdot \theta_0$ ($h = L \cdot \theta_0$).

Accordingly, if optical fibers have end faces polished according to the above equations, the incident and emergent angles are made equal to each other and optimum coupling can be obtained.

The reason for occurrence of the phase difference $\pi$ will now be described with reference to FIG. 11. The multilayer film is formed by alternately laminating a layer H of a material having a large refractive index (such as $TiO_2$) and a layer L of a material having a small refractive index (such as $SiO_2$). The thickness of each layer is adjusted to about $\frac{1}{4}$ of the wavelength of the laser beam used.

The outermost layer is the layer H of a material having a large refractive index.

Assuming that the refractive index of the layer H is $n_a$ and the refractive index of the layer L is $n_b$, the ray matrix of this half mirror is calculated according to the following equation:

$$\begin{pmatrix} M_{11} & JM_{12} \\ JM_{21} & M_{22} \end{pmatrix} = \begin{pmatrix} \cos\phi & J/n_a \sin\phi \\ Jn_a \sin\phi & \cos\phi \end{pmatrix} \begin{pmatrix} \cos\phi & J/n_b \sin\phi \\ Jn_b \sin\phi & \cos\phi \end{pmatrix} \cdots$$

$$\begin{pmatrix} \cos\phi & J/n_a \sin\phi \\ Jn_a \sin\phi & \cos\phi \end{pmatrix}$$

wherein $\phi$ is equal to $\lambda \cdot 2\pi\delta/\lambda_0$, $\lambda_0$ represents the central wavelength ($\lambda_0/4 = n_a d_a$ or $n_b d_b$) of the half-mirror at the time of design, $\delta$ indicates the degree of deviation of the wavelength at the time of use from the wavelength at the time of design, which is in the range of from 1.25 to 0.8, and the relation of $M_{11} = M_{22} = M$ is established.

Accordingly, the electric field $E_0$ and magnetic field $H_0$ of the laser beam within the half mirror are expressed as follows:

$$\begin{pmatrix} E_0 \\ H_0 \end{pmatrix} = \begin{pmatrix} M & JM_{12} \\ JM_{21} & M \end{pmatrix} \begin{pmatrix} 1 \\ n_s \end{pmatrix}$$

wherein $n_s$ stands for the refractive index of the optical substrate.

Ordinarily, the reflectance 1R on a film is expressed as follows:

$$1R = \left| \frac{E_0 - H_0/n_0}{E_0 + H_0/n_0} \right|^2$$

wherein $n_0$ stands for the refractive index of the film.

Accordingly, amplitudes and phases of the light incident on the half-mirror in the direction of arrow A and reflected in the direction of arrow A', and of the light incident on the half-mirror in the direction of arrow B and reflected in the direction of arrow B', are expressed as follows:

$$1R_{A \to A'} = \left( \frac{M^2(n_s - n_0)^2 + (M_{12}n_0 n_s - M_{21})^2}{M^2(n_s + n_0)^2 + (M_{12}n_0 n_3 + M_{21})^2} \right) |e^{J\theta_1}|^2$$

$$1R_{B \to B'} = \left( \frac{M^2(n_s - n_0)^2 + (M_{12}n_0 n_s - M_{21})^2}{M^2(n_s + n_0)^2 + (M_{12}n_0 n_s + M_{21})^2} \right) |e^{J\theta_2}|^2$$

From the above equations, $\theta_1$ and $\theta_2$ are calculated as follows:

$$\theta_2 = \frac{M_{12}n_0 n_s - M_{21}}{\sqrt{M^2(n_s - n_0)^2 + (M_{12}n_0 n_s - M_{21})^2}} -$$

$$\frac{M_{12}n_0 n_s + M_{21}}{\sqrt{M^2(n_s + n_0)^2 + (M_{12}n_0 n_s + M_{21})^2}}$$

$$\theta_1 = \frac{-(M_{12}n_0 n_s - M_{21})}{\sqrt{M^2(n_0 - n_s)^2 + (M_{21}n_0 n_s - M_{21})^2}} -$$

$$\frac{M_{12}n_0 n_s + M_{21}}{\sqrt{M^2(n_s + n_0)^2 + (M_{12}n_0 n_s + M_{21})^2}}$$

In the above equations, the second terms are equal to each other. The first terms are different only in sign. The absolute values are equal to each other. Accordingly, it is seen that if light is incident on the multilayer film substantially vertically thereto, the amplitudes are equal and the phases deviate only by $\pi$. In contrast, the phase of the light transmitted through the half-mirror is not influenced at all. Light is not always reflected in the thickness center of the multilayer half-mirror. The effective thickness deviation at light reflection produces the optical phase difference of $\lambda/4$, between the transmitted and reflected light of in the counterclockwise and clockwise directions from the fiber coil.

The above feature will now be described with reference to FIG. 9. The light reflected on the half-mirror $HF_2$ is light propagated in the optical fiber $F_{13}$ in the counterclockwise direction. The light transmitted through the half-mirror $HF_2$ is the light propagated in the optical fiber $F_{13}$ in the clockwise direction. Accordingly, at the point of incidence on the optical fiber $F_{12}$, a phase deviation of $\lambda/4 + \theta$ is produced, where the light phase shift $\theta$ is produced by Sagnac effect.

A modification of the embodiment of FIG. 9 is illustrated in FIG. 12. In this embodiment, the ball lenses L5 and L6 are additionally arranged in the structure shown in FIG. 9. In this embodiment, the inclinations of the end faces $F_{11a}$, $F_{12a}$, $F_{13a}$, and $F_{13b}$ are reverse to those in FIG. 9. The tilt angles and other factors in this embodiment are described in detail in the thesis entitled "Single-Mode Fiber Optical Directional Coupler" published in the "Optical Society of America", Vol. 19, No. 19, pages 3484 to 3488. Accordingly, a detailed explanation is omitted here.

Figure 13:
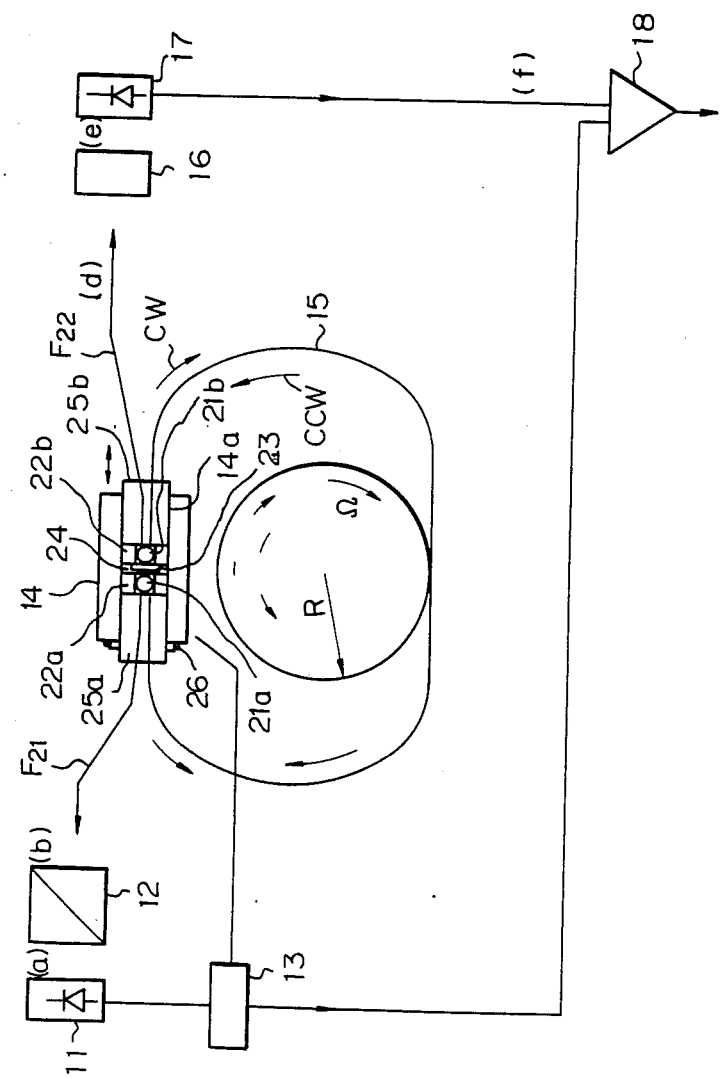
FIG. 13 is a diagram of a third embodiment of the fiber-optic gyro according to the present invention.

FIG. 13 is a diagram of a third embodiment of the present invention. In FIG. 13, reference numeral 11 represents a laser diode, 12 represents a Glan-Thomson prism, 13 an oscillator, 14 an electrostriction element, 15 a fixed polarization fiber, 16 a phase plate, 17 a light detector, and 18 a phase detector. In the electrostriction element 14, there are disposed ball lenses 21a and 21b, lens holders 22a and 22b, a half mirror 23, a space 24 producing $\lambda/4$ modulation, plugs 25a and 25b, and optical fibers $F_{21}$ and $F_{22}$.

In the system shown in FIG. 13, one end of the optical fiber $F_{21}$ and one end of the fixed, single polarization-maintaining, single-mode, optical fiber 15 are inserted in the plug 25a. The ball lens 21a is held by the lens holder 22a to confront the end faces of both the optical fibers. The half-mirror 23 is secured to the lens holder 22a. One end of the optical fiber F22 and the other end of the fixed-polarization optical fiber 15 are inserted in the plug 25b. The ball lens 21b is held by the lens holder 22b to confront the end faces of both the optical fibers. The plugs 25a and 25b are inserted in a through-hole 14a formed in the piezoelectric-effect ceramic element 14. The plug 25a is secured to the electrostriction element 14 by an adhesive 26.

Light emitted from the laser diode 11 passes through the Glan-Thomson prism 12 and is converted to linearly polarized light. The polarized light is converged by the ball lens 21 and branched into two light beams by the half-mirror 23. One light beam passes through the half mirrow 23 and is propagated through an optical fiber loop having a radius R in the form of clockwise light CW passing through the ball lens 21b and arriving at the fixed polarization optical fiber 15. The other light beam is reflected on the half-mirror 23 and is guided to the fixed-polarization optical fiber 15 in the form of counterclockwise light CCW. The clockwise and counterclockwise signals are phase-shifted by the phase plate 16, detected by the light detector 17, and output through the phase detector 18.

The polarization states of the signal at points (a), (b), (c), (d), (e), and (f) are shown by the corresponding signals in FIGS. 14(c) to (e). FIG. 14, (a) shows light emitted from the laser diode, FIG. 14(b) shows light linearly polarized in the Glan-Thomson prism 12 and light propagated in the fixed polarization optical fiber in the clockwise direction, FIG. 14(c) shows light propagated in the fixed polarization optical fiber in the counterclockwise direction, and FIG. 14(d) shows light propagated in the optical fiber F22. Incidentally, the angle $\theta$ shown in FIG. 14(d) is represented by the following equation:

$$\theta = \frac{2\pi LR \cdot \Omega}{\lambda c}$$

wherein L stands for the entire length of the fixed polarization optical fiber coil, R stands for the radius of the coil, $\Omega$ stands for the rotation angle speed (radian/sec) of the fiber, $\lambda$ stands for the wavelength of light, and c stands for the speed of light in vacuum.

The signal (d) having a difference of angle $2\theta + \lambda/4$ is obtained by the phase plate Babinet compensator 16, with linear polarization as shown in FIG. 14-(e), and input in the light detector 17. FIG. 14-(e) also shows the output signal of the light detector 17. This signal is phase-detected by the phase detector 18 and is output from the phase detector 18.

The sequential relationship among the output light of the laser diode 11, the modulation output of the electrostriction element 14, and the light signals propagated in the fixed-polarization optical fiber 15 in the clockwise and counterclockwise directions will now be described with reference to FIGS. 15(a) to (e) and 16.

The laser diode 11 is driven at a timing shown in FIG. 15-(a) by the output of the modulator 13. Namely, the light emission time interval $t_{opc}$ is larger than the time $\tau_c$ required for light to pass through the optical fiber loop 15. In this embodiment shown in the drawings, $t_{opc}$ is two times as long as $\tau_c$. Incidentally, $\tau_c$ is expressed by the following equation:

$$\tau_c = L \cdot n / c$$

wherein L stands for the entire length of the optical fiber coil, n stands for the refractive index of the core, and c stands for the speed of light in vacuum.

The electrostriction element 14 is modulated at a timing shown in FIG. 15-(c). The timing $\tau_m$ is equal to $t_{opc}$. This modulation time is longer than the modulation time of the laser diode 11.

Figure 16:
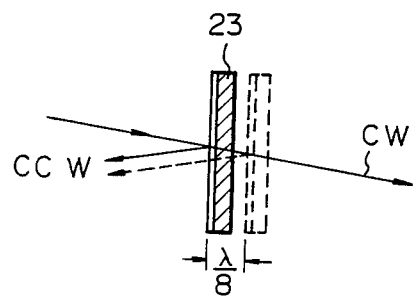
FIG. 16 is a diagram of the movement of the half mirror of FIG. 13.

Since the plug 25a is shifted by modulation of the electrostriction element 14, the half mirror is shifted from the solid line position to the dotted line position as shown in FIG. 16. The shifting distance is $\lambda/8$. By this shift, the reflection point at the half mirror 23 is deviated by $\lambda/8$ in connection with the signal CCW propagated in the fixed polarization optical fiber 15 in the counterclockwise direction. The light CW propagated in the fixed polarization optical fiber 15 in the clockwise direction is not influenced by the above-mentioned shift.

Accordingly, when the lights CCW and CW are incident on the fixed polarization optical fiber 15, a phase difference of $\lambda/4$ is produced between the light beams CCW and CW. This stage is shown in FIGS. 15-(d) and 15-(e), (d) indicating the light CCW and (e) indicating the light CW. As shown in FIG. 15-(b), the light beams from both the ends of the fixed polarization optical fiber 15 are synthesized by the half mirror 15, are incident on the light detector 17, and are converted to an electric signal. This signal opens the gate to the phase detector 18 at the timing of incidence on the phase detector 18, whereby phase detection is effected. The light CCW and CW synthesized by the half mirror 23 are expressed as $\sin(\omega t + (\lambda/4) + \theta)$ and $\sin(\omega t - \theta)$, respectively. Accordingly, the light obtained by synthesizing the light beams CCW and CW is expressed as $\cos \omega t \cdot \sin \theta$. The component $\cos \omega t$ has a very high frequency and seems to be modified by the component $\sin \theta$. Accordingly, the angular speed is determined by using the component $\sin \theta$.

Figure 17:
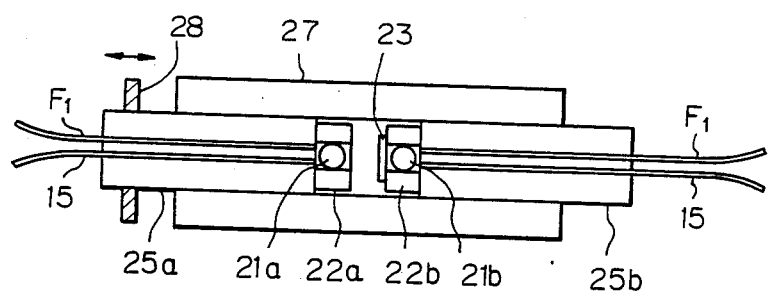
FIGS. 17 and 18 are diagrams of modifications of the third embodiment according to the present invention.

FIG. 17 shows a modification of the embodiment of FIG. 13. In FIG. 17, reference numeral 27 represents an adaptor and reference numeral 28 represents a ceramic oscillator. The same members as shown in FIG. 13 are represented by the same reference numerals. In this embodiment, the ceramic oscillator 28 is attached to the plug 25a. This ceramic oscillator 28 is oscillated at the above-mentioned timing. By this oscillation, the plug 25a is moved in the direction indicated by an arrow. Accordingly, a phase difference $\lambda/4$ can be produced between light beams CCW and CW.

Figure 18:
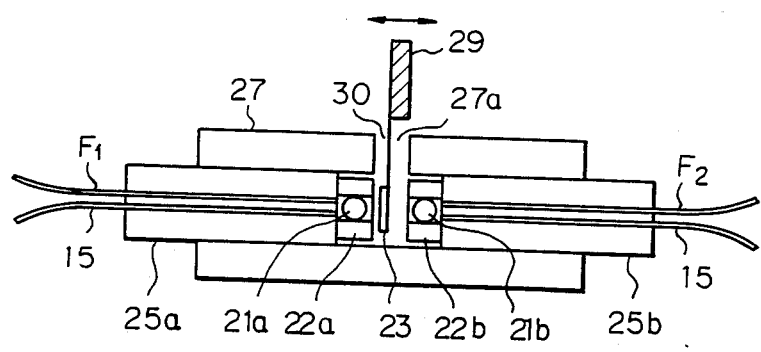

FIG. 18 shows still another modification of the embodiment of FIG. 13. In FIG. 18, reference numeral 27 represents an adaptor, 29 a ceramic oscillator, and 30 a coupler. The same members as shown in FIG. 13 are represented by the same reference numerals. In this embodiment, a through hole 27a is formed in the adaptor 27, and the half mirror 23 connected to the ceramic oscillator 29c through the coupler 30 is inserted in this through hole 27a. In this structure, the ceramic oscillator 29 is oscillated, whereby a phase difference $\lambda/4$ is produced between the light beams CCW and CW as described above.

Figure 19:
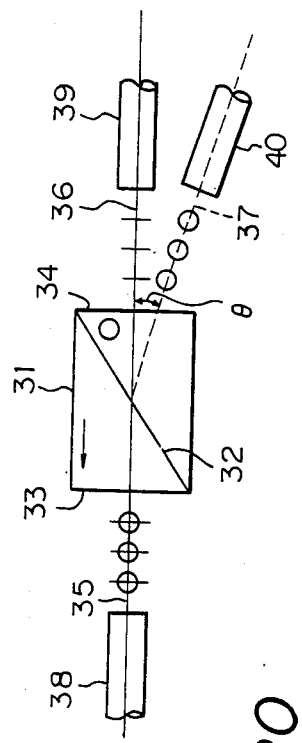
FIG. 19 is a diagram of the structure of a conventional polarized light branching and synthesizing system using a Rochon prism.

A Rochon prism has been used as a means for separating input light into two polarized lights having oscillation directions perpendicular to each other, namely normal and abnormal lights. FIG. 19 is a diagram of the separation of input light into polarized light beams in a conventional Rochon prism. In FIG. 19, reference numeral 31 represents a Rochon prism formed of a birefringent substance. A junction interface 32 acts as the boundary. There are formed a first portion 33 having an optical axis parallel to the paper plane of FIG. 19, and a second portion 34 having an optical axis perpendicular to the paper plane of FIG. 19. When circularly polarized or randomly polarized input light 35 is incident on the Rochon prism 31, an abnormal light 36 having an oscillation direction parallel to the paper plane is advanced straight as indicated by reference numeral 36 but the course of normal light having an oscillation direction perpendicular to the paper plane is bent as indicated by reference numeral 37 and emerges in a direction having a certain angle $\theta$ to the incident direction. Thus, the polarized light separation of the input is accomplished. In contrast, when both the polarized light beams are incident from the directions 36 and 37, synthesized light emerges in the direction 35.

However, it is not always appropriate to effect polarized light branching and synthesis between input and output optical fibers by utilizing such a Rochon prism. More specifically, in the case where an input light 35 is incident from an optical fiber 38, as shown in FIG. 19, an abnormal output light 36 having the same circular section as that of the optical fiber 38 can be coupled efficiently with an optical fiber 39, but a normal output light 37 comes to have an elliptical section and cannot efficiently be coupled with an optical fiber 40. If it is intended to increase the efficiency of this coupling, a special optical fiber becomes necessary.

Also, according to the conventional technique, the end faces of the Rochon prims 31 and the optical fibers 38, 39 and 40 are arranged perpendicularly to the optical path. Therefore, the incident light is reflected and returns to the light source to cause interference. Ordinarily, this return loss is about 14 dB per end face. Even if a non-reflective coating is applied, the return loss is reduced only to a level of about 25 dB. The greater the number of the reflected faces in the optical path, the more the return loss. Therefore, in a conventional polarized light branching and synthesizing system utilizing a Rochon prism, it is impossible to control the return loss to a sufficiently low level.

Furthermore, a customarily used optical fiber has a circular section. Therefore, formation of different polarized components based on small bends or convexities and concavities on the boundary face of the core cannot be avoided. These different polarized components are produced by return light reflected on a reflecting face having a large return loss, resulting in cross-talk. In the conventional system, since the return loss is large, it is impossible to sufficiently reduce the cross-talk loss.

As means for holding an optical fiber, there is known a method in which an optical fiber is held in a V-shaped groove extending in a certain direction and formed on a silicon substrate by etching. In the conventional system shown in FIG. 19, since it is impossible to make both the output light beams parallel to the input light, it is not permissible to utilize such a V-shaped groove. This complicates the structure of the apparatus and increases the apparatus size.

Figure 20:
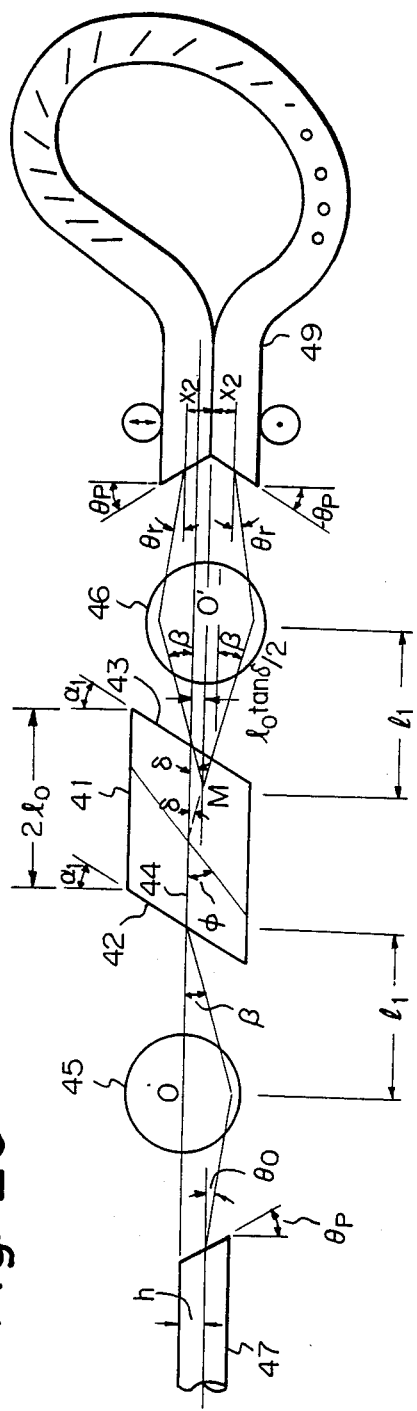
FIG. 20 is a diagram of a fourth embodiment of the fiber-optic gyro according to the present invention.
Figure 22A:
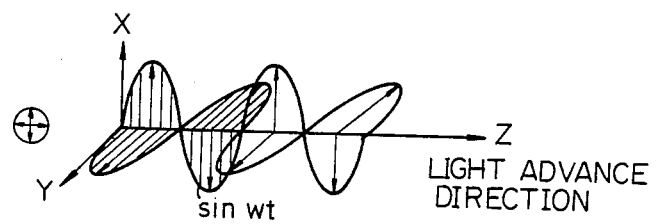
Figure 22B:
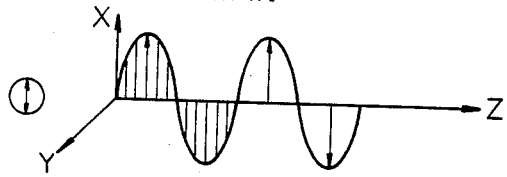
Figure 22C:
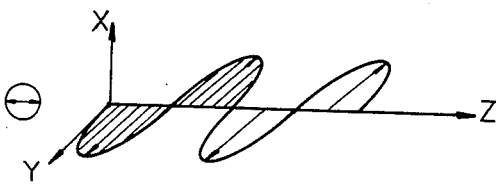
Figure 22D:
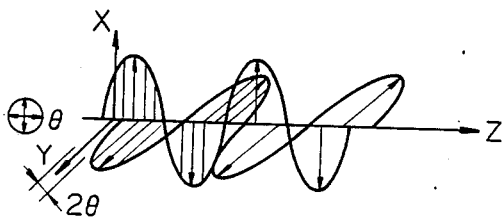

FIG. 20 is a diagram of a fourth embodiment of the present invention which can eliminate the drawbacks in the structure shown in FIG. 19. In FIG. 20, reference numeral 41 represents a Rochon prism having a tilt angle $\alpha 1$ on both the end faces 42 and 43, 44 a mechanical axis of the Rochon prism, 45 and 46 ball lenses having a focal distance F, 47 an input optical fiber having a tilt angle $\theta p$, and 48 and 49 output optical fibers having tilt angles of $\theta p$ and $-\theta p$. In order to maintain the coherency of the input and output lights and reduce the cross-talk loss, it is preferred that each of the optical fibers be a single-mode optical fiber.

When light is incident on the end face 42 of the Rochon prism 41, the emergent light is separated into abnormal and normal light beams with a separation angle $\delta$ with respect to the mechanical axis 14 from the equivalent light branching point M in the Rochon prism. It is known that, assuming that the refractive index of a birefringent substance forming the Rochon prism 41 with respect to the abnormal light is $n_e$ and the refractive index of the substance with respect to the normal light is $n_0$, the above-mentioned separation angle $\delta$ is determined by the following relation:

$$\alpha_1 = [+n_e/(n_e+n_0-2)]\cdot\delta \tag{41}$$

Incidentally, the separation angle $\delta$ is expressed by the following formula:

$$\delta = \frac{n_e - n_0}{n_a n_0}(\phi + \alpha_1) + 2\beta$$

wherein $n_a$ stands for the refractive index of air, $\phi$ stands for the angle between the joint interface and the mechanical axis in the Rochon prism, and $\beta$ stands for the incident angle with respect to the Rochon prism.

Assuming that when the optical fiber 47 is arranged in parallel to the mechanical axis 44, the light emergent from the optical fiber 47 at the emergent angle $\theta_0$ in incident on the end face 42 at the incident angle $\beta$ through the ball lens 45 having its center on the mechanical axis 44. At this time, the distance between the center O of the ball lens and the incident point is $l_1$ (same as I above), the following relation is established:

$$\beta = F(\tan\theta_0 + h)/l_1 \tag{42}$$

wherein h stands for the distance between the optical axis of the optical fiber 47 and the mechanical axis 44.

Assuming that the ball lens 46 is arranged so that its center O' is located at a point separated by the distance $l_1$ from the equivalent light branching point M and the abnormal and normal light beams emergent at the emergent angle $\beta$ from the end face 43 of the Rochon prism 41 pass through the ball lens 46 and are incident at the incident angle $\theta_r$ on the optical fibers 48 and 49 arranged in parallel to the mechanical axis 44 at the points separated by an equal distance x2 from the center O' of the ball lens 46, the following relation is established:

$$\begin{pmatrix} x_2 \\ \theta_r \end{pmatrix} = \begin{pmatrix} -1 & 0 \\ 2(-1/F + l_1/F^2) & -1 \end{pmatrix} \begin{pmatrix} h \\ \theta_0 \end{pmatrix} \tag{43}$$

Incidentally, since the equivalent light branching point M is produced at a position separated by a certain distance from the mechanical axis 44, it is necessary that also the center O' of the ball lens 46 should be located at a position separated by the distance $l_0 \tan(\delta/2)$ from the mechanical axis 44 as shown in FIG. 20.

The following relations are established:

$$x_2 = \pm h \tag{44}$$

$$\theta_0 = \theta_r \qquad (45)$$

and the incident angle $\theta_r$ is calculated from the equation (43) as follows:

$$\theta r = (l_1 - F)h/F^2 \qquad (46)$$

Accordingly, if $\theta r$, $l_1$, F, and h are determined so that the condition of the equation (46) is satisfied, both the relations of equations (44) and (45) are established. This means that the input and output fibers and both the ball lenses are arranged symmetrically with respect to the Rochon prism.

Furthermore, in this case, the relation of the angles $\theta_0$ and $\theta_r$ to the angle $\theta p$ is determined by the following equation:

$$\theta_0 = \theta_r = \sin^{-1}(N_c/n_a \cdot \sin \theta p) - \theta p \qquad (47)$$

wherein $n_c$ stands for the refractive index of the core of the optical fiber and $n_a$ stands for the refractive index of air.

In the polarized light branching and synthesizing system of the present invention, as shown in FIG. 20, the Rochon prism, the input and output optical fibers, and the lenses connecting them are arranged so that the relations of the equations (41), (46) and (47) are established among the tilt angle $\alpha 1$ of the Rochon prism, the emergent angle $\theta_0$ of the output optical fiber, the incident angle $\theta_r$ of the output optical fiber, and the focal distance F of both the lenses; light emergent at a certain emergent angle from the optical fiber on the input side is separated into abnormal and normal light beams and they are incident at an incident angle equal to the emergent angle on both the optical fibers on the output side. Therefore, when the same optical fibers are used as the optical fibers on the input and output sides, a highest coupling efficiency can be maintained between the input and output optical fibers.

Furthermore, in the system shown in FIG. 20, all of the emergent end face of the input optical fiber, the incident and emergent end faces of the Rochon prism, and the incident end face of the output optical fiber have certain tilt angles. Beams emergent from and incident on the coupling ball lenses do not pass through the centers. Accordingly, a face perpendicular to the optical path is not present on the optical path. Therefore, the return loss is greatly reduced and the cross-talk loss is similarly reduced.

Incidentally, in this case, the return loss and cross-talk loss are ordinarily calculated according to the following equation:

$$L = -10 \log (\exp(-(\pi \omega T/\lambda)^2)) \qquad (48)$$

wherein $\omega$ stands for the frequency of light, T stands for the incident or emergent tilt angle, and $\lambda$ stands for the wavelength of light. Assume that the following relation is established:

$$T = 2\theta p \qquad (49)$$

wherein L indicates the return loss, and assume that the following relation is established:

$$T = 3\theta_0 + 2\theta p \qquad (50)$$

wherein L indicates the cross-talk loss.

As is apparent from the structure of the system shown in FIG. 20, the system can be reversely operated.

Namely, if abnormal and normal lights are incident on the optical fibers 48 and 49, circularly polarized light or randomly polarized light consisting of a mixture of the abnormal and normal light can be obtained on the optical fiber 47.

FIG. 21 is a diagram of a modification of the fourth embodiment of the present invention. In FIG. 21, reference numeral 51 represent a laser diode, 52 a lens, 53 a Glan-Thomson prism, 54 a lens, 55 a phase plate, 56a and 56b lenses, 57 a half mirror, 58 a monitor, 59 a Babinet compensator, 60 a lens, 61 a Rochon prism, 62 a lens, 63 a single polarization-plane storing single mode fiber loop, and 64 a light detector.

In the embodiment illustrated in FIG. 21, light from the laser diode 51 is incident on the lens 56a through the lens 52, Glan-Thomson prism 53, lens 54 and phase plate 55. A part of the incident light is reflected on the half mirror 57 and input in the monitor 58. The remaining part of the incident light passes through the half mirror 57, lens 60 and Rochon prism 61. They are input into the single polarization-plane maintaining fiber 63 as the optical signals having polarization plane angles at 90° to each other. The fiber 63 has a circular shape in which the radius is R. The optical signals input in the same polarization maintaining optical path of the fiber 63 from both the ends 63a and 63b are propagated through the same optical path of the fiber 63 in the clockwise and counterclockwise directions, reflected on the half mirror 57 via the Rochon prism 61, and output through the phase plate 59.

The polarization states of the signal at points (a), (b), (c), (d), (e) and (f) shown in FIG. 21 are shown by corresponding symbols in FIGS. 22-(a) to -(e).

In FIG. 22, (a) shows the light emitted from the laser diode and FIG. 22-(b) shows the light polarized by the Glan-Thomson prism 53, which is linearly polarized light. The phase plate 55 forms circularly polarized light from the linearly polarized light in FIG. 22-(a). This circularly polarized light is incident on the Rochon prism 61. The refractive index of the Rochon prism 61 varies according to the polarization direction. Accordingly, separated oututs are output from the Rochon prism 61, as shown in FIGS. 22-(b) and 22-(c). The separated outputs of the Rochon prism 61 are respectively incident on the ends 63a and 63b of the polarization-plane storing fiber 63. The light beams are incident from the polarization-plane storing fiber 63 via the Rochon prism 61 to form light as shown in FIG. 22-(d). This light is guided to the half mirror 57, is reflected thereon, and is incident on the phase plate 59. At this point, the angle $\theta$ is expressed as follows:

$$\theta = \frac{2\pi LR \cdot \Omega}{\lambda c}$$

wherein L stands for the total length of the fixed polarization fiber coil, R stands for the radius of said fiber coil, $\Omega$ stands for the rotation angle speed (radian/sec) of the fiber, $\lambda$ stands for the wavelength of the light and C stands for the speed of light in vacuum.

In the signal (d) having a phase difference of angle $\theta$, the light of one polarization direction is phase-shifted by $\pi/2$, and the angle $2\theta$ is increased to $2\theta + \pi/2$ as shown in FIG. 22-(e). Then, the signal is incident on the light detector 64. FIG. 22-(e) shows the output signal of the light detector.

Figure 23:
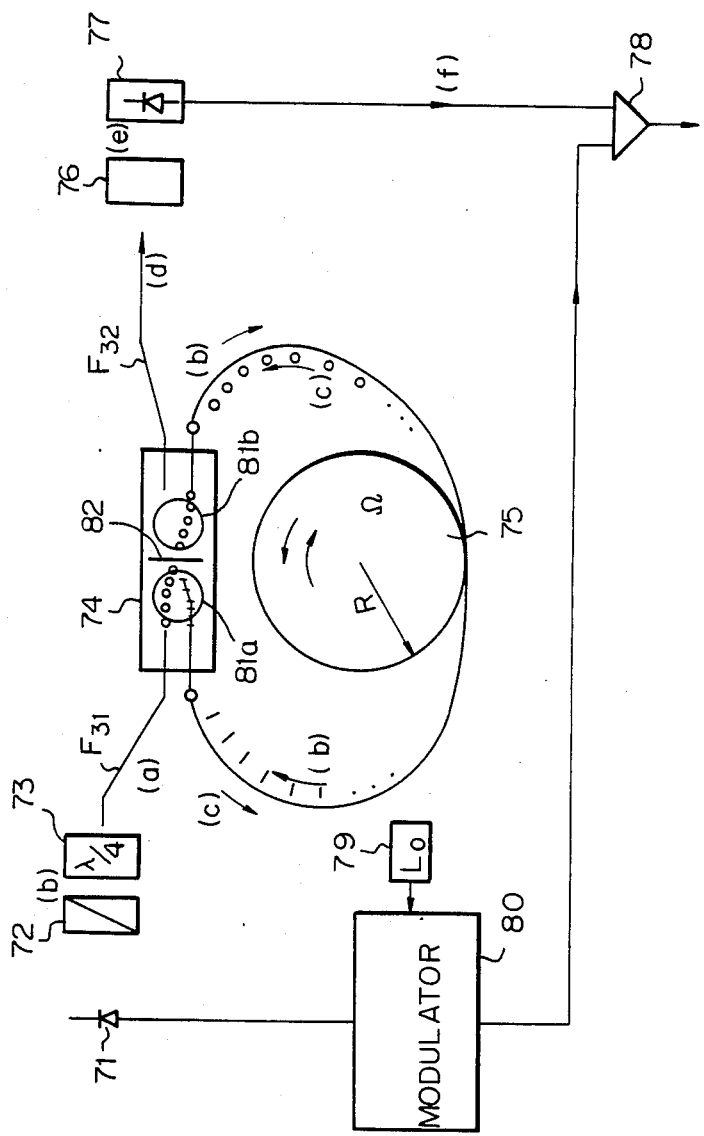
FIGS. 23 and 24 are diagrams of further modifications of the fourth embodiment according to the present invention.

FIG. 23 illustrates another modification of the embodiment of the fiber-optic gyro of FIG. 20. In FIG. 23, reference nuemral 71 represents a laser diode, 72 a Glan-Thomson prism, 73 λ/4 phase plate, 74 an electrostriction element, 75 a fixed polarization fiber, 76 a phase plate, 77 a light detector, 78 a phase detector, 79 an oscillator, and 80 a modulator. In the adaptor 74, ball lenses 81a and 81b, a polarization separating half mirror 82, and optical fibers $F_{31}$ and $F_{32}$ are arranged.

In the system illustrated in FIG. 23, light emitted from the laser diode 71 is converted to linearly polarized light by the Glan-Thomson prism 72 and is converted to circularly polarized light by the λ/4 phase plate. The reason why the Glan-Thomson prism is used is that completely circularly polarized light is obtained at the time of conversion by the λ/4 phase plate. The circularly polarized light from the λ/4 phase plate is incident and convergent on the ball lens 81a through the optical fiber $F_{31}$ and is separated into light beams having polarization planes crossing at right angles by the half mirrow 82. One light beam passes through the half mirror 82 and forms a clockwise signal passing through the ball lens 81b, arriving at the fixed polarization maintaining single mode fiber 85 and returning to the ball lens 81a through the optical fiber loop having a radius R. The other light beam is reflected on the half mirror 82 and forms a counterclockwise signal guided to the fixed polarization fiber 75. The polarization-maintaining axes of the fiber ends axis of 81a, 81b are arranged orthogonally to each other, and the fiber coil 75 is twisted by 90°, as shown in FIG. 23. The clockwise and counterclockwise signals are guided to the Babinet compensator phase plate 76 through the optical fiber $F_{32}$. After the phase shifting in the phase plate 76, the signals are detected by the light detector 77 and output through the phase detector.

The signal polarization states at points (a), (b), (c), (d), (e), and (f) shown in FIG. 23 will also be explained with reference to FIGS. 22-(a) to -(e).

Namely, FIG. 22-(a) corresponds to the light emitted from the laser diode, FIG. 22-(b) corresponds to the light polarized by the prism 72 and the light propagated in the fixed polarization fiber in the clockwise direction, FIG. 22-(c) corresponds to the light propagated in the fixed polarization fiber in the counterclockwise direction, and FIG. 22-(d) corresponds to the light output from the adaptor 74. In this case, the angle θ is expressed as follows:

$$\theta = \frac{2\pi L R \cdot \Omega}{c\lambda}$$

wherein L stands for the total length of the fixed polarization fiber coil, R stands for the radius of the fiber coil, Ω stands for the rotation angle speed (radian/sec) of the fiber, λ stands for the wavelength of the light, and C stands for the speed of the light vacuum.

In the signal (d) having a phase difference of angle 2θ, the phase of the light propagated in one direction is phase-shifted by λ/2 by the phase plate 76. The angle 2θ is increased to 2θ+λ/2 as shown in FIG. 4-(e), and the light is input in the light detector 77. FIG. 22-(e) corresponds to the output signal of the light detector 77. This signal is phase-detected by the phase detector 78 and output therefrom.

Figure 24:
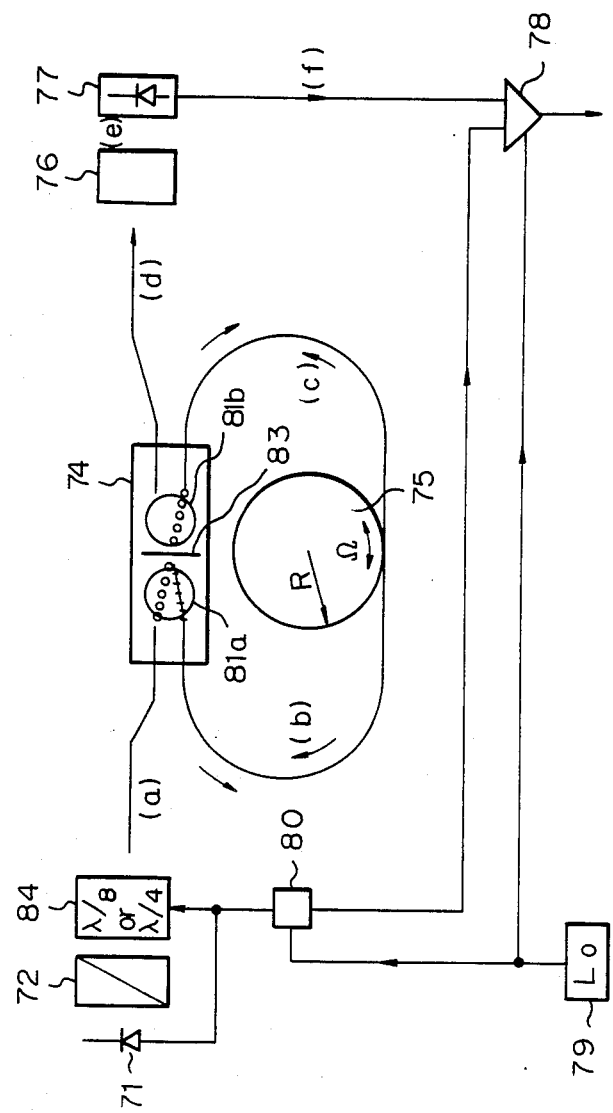

FIG. 24 illustrates another modification of the embodiment shown in FIG. 20. The embodiment shown in FIG. 24 differs from the embodiment shown in FIG. 23 in the point that the output of the laser diode 71 is converted to circularly polarized light by a λ/8 or λ/4 phase modulator 84 and that this polarized light is incident on the ball lens 81a. Other circuits and functions are the same as in FIG. 23.

Figure 25:
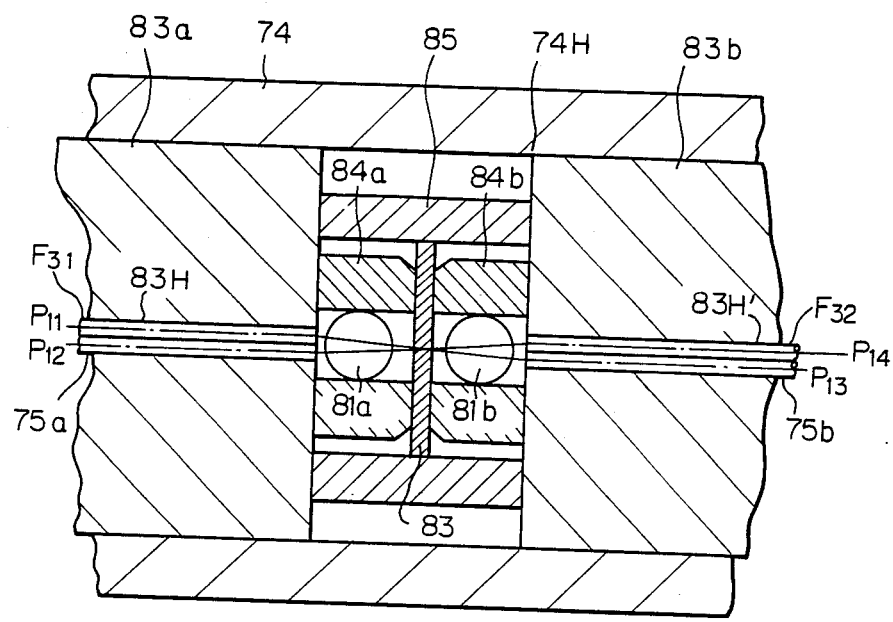
FIG. 25 is a detailed diagram of parts of FIGS. 23 and 24.

Light input and output portions of the ball lenses 81a and 81b, optical fibers $F_{31}$ and $F_{32}$, and fixed polarization fiber 75 in FIGS. 23 and 24 are constructed as shown in FIG. 25. In FIG. 25, reference numerals 83a and 83b show cores, 84a and 84b are lens holders, and 85 is a supporting member.

As shown in FIG. 25, the end of the optical fiber $F_{31}$ and the end 75a of the fixed polarization fiber 75 are disposed in a hole 83H formed at the center of the cylindrical core 83a. The end of the optical fiber $F_{32}$ and the end 75b of the fixed polarization fiber 75 are disposed in a hole 83H' formed at the center of the cylindrical core 83b. The cores 83a and 83b are inserted in the sleeve-like adaptor 84 so that the centers of the cores 83a and 83b are matched with each other. They are secured in this state by securing means (such as cap nuts). The ball lenses 81a and 81b are supported in front of the optical fiber having end faces exposed to the centers of the cores 83a and 83b by means of supporting members 84a and 84b. The half mirror 83 (composed of a dielectric multilayer film) is supported between the ball lenses 81a and 81b by the supporting member 85. The light P1 propagated through the optical fiber $F_{31}$ is separated into lights $P_{12}$ and $P_{13}$ by the half mirror 83.

The light beams $P_{12}$ and $P_{13}$ are propagated through the fixed polarization fiber 75 in directions opposite to each other and are synthesized to provide a light beam P14 by the half mirror 83. The light P14 is incident on the optical fiber $F_{32}$.

In the fiber-optic gyro of the present invention, the laser diode must stabilize the luminescence wavelength. In the conventional technique, a laser diode having a good luminescence wavelength stabilizing effect is chosen, and an isolator is arranged to prevent changes of the luminescence wavelength caused by reflected light from an end face of a light-transmitting optical fiber. However, this isolator cannot completely block the reflected light. Furthermore, reflection is caused on the end face of the isolator. Accordingly, the luminescence wavelength inevitably fluctuates.

Figure 26:
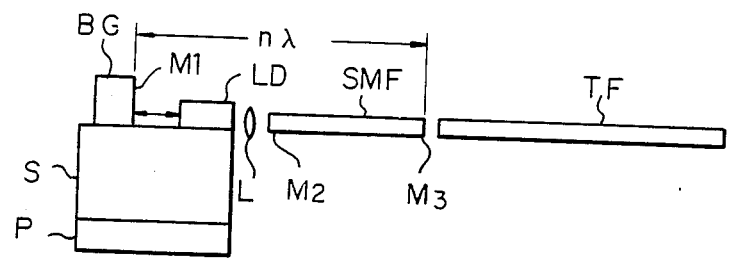
FIG. 26 is a diagram of a preferred structure of the laser diode used in the present invention.

This drawback can be removed by a single-mode semiconductor laser diode. Reflecting members are arranged to confront light-emergent parts on both the end portions of a semicodnuctor laser diode so that an etalon is constructed. FIG. 26 is a diagram of a preferred laser diode used in the present invention. In FIG. 26, P stands for a Peltier element, S stem, BG a bulk glass, SMF a single-mode fiber, M1, M2, and M3 reflecting faces, TF transmitting optical fiber, and L a lens.

In order to perform locking of the longitudinal mode highly stable and precisely, the bulk glass BG is arranged on a rear luminescence face of the laser diode LD. The single-mode fiber SMF, in which an etalon is constructed on the end faces by the reflecting faces M2 and M3, is arranged on a front illuminescence face of the laser diode LD.

In the above-mentioned structure, one etalon is constructed between the reflecting face M1 of the bulk glass BG and the laser diode LD, and another etalon is constructed between the reflecting faces M2 and M3 of the single-mode fiber. The laser diode constitutes one etalon. Accordingly, three etalons are arranged in series. The optical distance between the reflecting faces M1 and M2 is n times the luminescence wavelength λ.

The functions will now be described. A laser beam having a certain spectrum width emerges from the laser diode LD. In this laser beam, the emergent angle varies according to the spectrum. Accordingly, the incident angle on the reflecting face M1 of the bulk glass BG varies. The laser beam is divided into light reflected from the reflecting face M1 and light not reflected therefrom, according to the incident angle. Accordingly, the spectrum of the light fed back to the laser diode LD is narrower than the spectrum of the light emerging from the laser diode LD.

Furthermore, a wide light spectrum width of a single longitudinal mode can be obtained (from the optical system shown in FIG. 26) by modulating the optical length $n_l$, such as position modulation of the reflecting faces M1 to M3, or LD current modulation.

The light from the laser diode LD, which has a appropriate spectrum width, is incident on the single-mode fiber SMF. Reflection is repeated between the reflecting faces M2 and M3 in the single-mode fiber SMF. Only light having a certain wavelength determined by the length of the single-mode fiber is transmitted through the reflecting faces M2 and M3. The transmitted light is fed back to the laser diode LD through the reflecting face M2 and is separately incident on the transmitting optical fiber TF through the reflecting face M3.

Figure 27A:
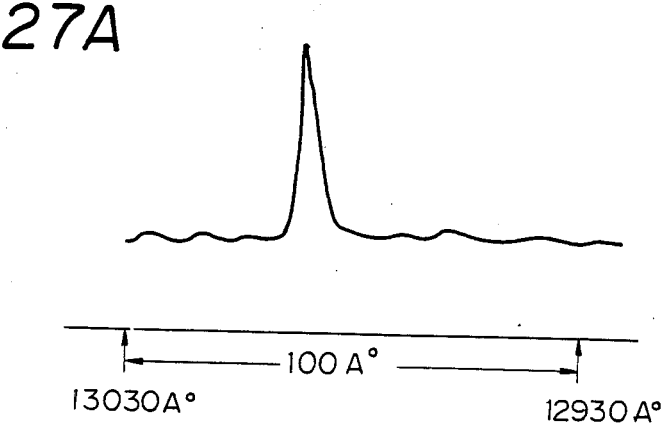
FIGS. 27A and 27B are diagram of results of experiments made by using the structure shown in FIG. 26.
Figure 27B:
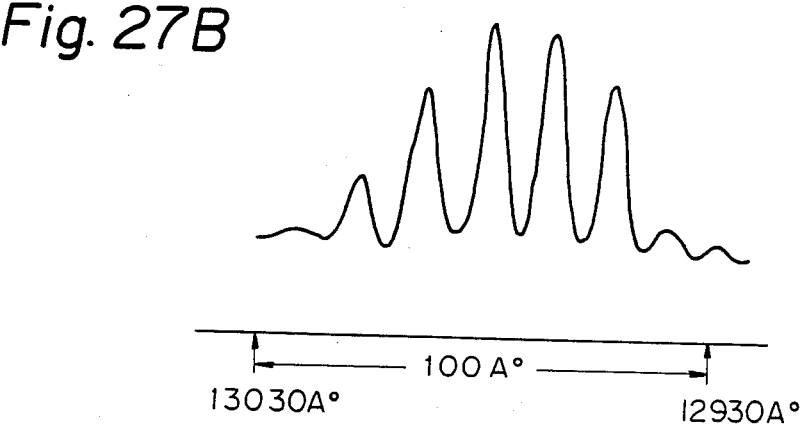

The results obtained by use of the preferred laser diode are shown in FIG. 27A without temperature drift of wavelength. According to the preferred laser diode, one longitudinal mode alone appears. FIG. 27B is a diagram of the luminescence spectrum from a laser diode having a conventional constitution. As is seen from FIG. 27B, according to the conventional technique, several longitudinal modes are generated within a region of 100 Å, with temperature drift of about 2.5 Å/°C.

Results of experiments made on the relation between the length of the single-mode fiber SMF and the transmittance ratio of the reflecting face will now be described. The length of the single-mode fiber SMF is changed with 5 mm as the center. The reflectance of each of the reflecting faces M2 and M3 is 95% and a wavelength λ of 1.305 μm is used. The obtained results are shown in FIG. 28.

Figure 28:
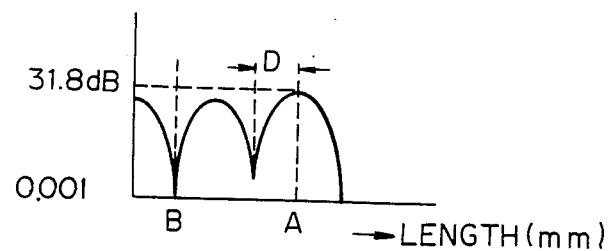
FIG. 28 is a diagram of the relation between the length of the single-mode fiber and the transmission loss.

In FIG. 28, the abscissa indicates the length (mm) of the single-mode fiber, and the ordinate indicates the transmission loss. The length (point A) giving the maximum transmission loss (31.8 dB) is 5.00143 mm, and the length (point B) giving the minimum transmission loss (0.00091 dB) is 5.000756 mm. As is apparent from FIG. 28, the transmission loss is periodically changed by changing the length of the single-mode fiber.

From FIG. 28, it is understood that the difference D between the length giving the maximum transmission loss and the length giving the minimum transmission loss is as follows:

$$D = \frac{\lambda}{4n} = \frac{A - B}{3} \approx 0.225 \ \mu m$$

As is apparent from the foregoing illustration, according to the preferred laser diode, a single-mode laser beam can be obtained. The level of this single-mode laser beam can be adjusted by fine adjustment of the length of the single-mode fiber.

FIG. 29 is a block diagram of a preferred light source portion of the present invention. In FIG. 29, a laser diode LD is inserted between narrow-band reflection filters BRF1 and BRF2, a light absorber ATT is arranged in back of the narrow-band filter BRF1, and an optical fiber OF for incidence of output light on the optical fiber coil is arranged in back of the other narrow-band reflection filter BRF2. In each of the narrow-band reflection filters BRF1 and BRF2, the front end face is a plane perpendicular to the optical axis and the rear end face is a diffraction lattice plane inclined at a predetermined angle to the plane that is perpendicular to the optical axis. Only the central light of a wavelength of fo is reflected as the a light wave of a very narrow band of less than $10^{-7}$ mm width in parallel to the incident light. Other components of wavelength fo⁻ or fo⁺ are reflected by angles different from the angle of the incident light, and, hence, they are not fed back to the laser diode LD. The light transmitted through the narrow-band reflection filter BRF 1 is absorbed by the light absorber ATT. The band width of the narrow-band reflection filter having the above structure can be reduced below several angstroms. Accordingly, the output of the laser diode can be stabilized in proportion to reduction of the band width. More specifically, since the phase of the reflected light from the narrow-band reflection filter is always stabilized, the laser diode is stabilized only by controlling the distance between the narrow-band reflection filter and the laser diode LD.

By using the above-mentioned light source, the coherency of light incident on the optical fiber coil is increased, and a very small rotation speed can be detected with a high precision even using a very long (100 km) fiber coil. Furthermore, since the light source is stabilized and hardly influenced by the return light, an isolator need not be arranged in the light route, and the apparatus is simplified.

Another preferred light source portion is illustrated in FIG. 30. Referring to FIG. 30, the laser diode LD is inserted between etalons SMF1 and SMF2 composed of a single-mode optical fiber. One end face of each of the etalons act as plane reflecting mirrors R1 and R2. Light incident from the laser diode LD is reflected on the plane reflecting mirror R1 or R2 and fed back to the laser diode LD. In this case, the single-mode optical fiber etalons SMF1 and SMF2 constitute a narrow-band reflection filter.

According to the preferred light source portions shown in FIGS. 29 and 30, there can be provided a fiber-optic gyro system in which the detection is highly stabilized, the efficiency is greatly increased, and the apparatus is simplified.

The polarization-plane storing fiber used in the present invention preferably is low in cost and has good properties and easy handling.

Examples of a conventional polarization-plane storing fiber are illustrated in FIGS. 31-(a) and 31-(b). In FIG. 31-(a), a cladding 92 surrounding a core 91 is formed to have an oval shape. A jacket 93 encloses this cladding 92. Heat strain caused at the time of production gradually changes the refractive index to be largest in the direction of the short axis and smallest in the direction of the long axis. A single light beam from a laser diode is separated into two linearly polarized light beams with respect to the short and long optical axes of the fibers. In the fiber shown in FIG. 31-(b), voids 96 and 96' are formed on a cladding 95 surrounding a core 94 symmetrically with respect to the axis. Also in this fiber, a gradual change of the refractive index is caused by the heat strain at the time of production.

As can readily be understood, it is very difficult to manufacture a fiber having a structure as described above and to obtain uniform characteristics along the entire length of the fiber, such as fluctuating in the polarization maintaining axis direction, crosstalk, and large polarization wavelength dispersion with large transmission loss (~5 dB/km). Further, in connecting fibers to each other, not only center alignment such as conducted in the conventional technique but also sectional form matching is necessary. In the case of fibers having a coil distortion smaller than 10 microns, this sectional form matching is not easy.

Moreover, when the above-mentioned fiber is used in the form of a coil as an angular speed sensor, if a variation of the refractive index due to the inner stress caused at the time of winding is taken into consideration, the positional relationship of the section to the winding face should be kept constant. Thus, handling of the fiber is very difficult.

The above drawback can be removed by a single-mode polarization plane storing optical fiber which includes a fiber composed of quartz and has a triple structure including a core, a cladding and a jacket, in which the difference of the refractive index between the core and cladding $$(\frac{n1 - n2}{2n1} \times 100$$

in which n1 represents the refractive index of the core and n2 stands for the refractive index of the cladding) is 0.13±0.05, the fiber being wound on a drum.

More specifically, in the preferred fiber, the sections of the core, cladding and jacket are concentric with one another. Therefore, the fiber of the present invention can be manufactured according to steps similar to those adopted for production of the conventional polarization plane non-storing fibers. Connection of fibers can easily be accomplished by only center alignment. Incidentally, ±0.05 is production error. This error is caused since the refractive index is smaller than those of ordinary optical fibers.

In the linear state, this optical fiber has no polarization-plane storing property. If the optical fiber is wound on a cylindrical drum, however, the outer portion of the optical fiber is elongated in the direction rectangular to the axis of the cylindrical drum and is contracted on the drum side. On the other hand, no distortion is caused in the direction that is parallel to the axis of the cylindrical drum. Thus, the shape is changed according to directions, and a polarization-plane storing property is thus manifested. This may be regarded as being similar to a rectangle-circle waveguide convertor.

Of course, if a conventional otpical fiber for communication is bent, a minute directionality of the refractive index is produced, but since the polarization-plane storing property is not considered and the refractive indexes of the core and cladding are selected so that the transmission loss is reduced to a minimum level, the ratio between the refractive indexes of the core and cladding $$(\frac{n1 - n2}{2n1} \times 100$$

in which n1 stands for the refractive index of the core and n2 stands for the refractive index of the cladding) is as large as 0.2% to 0.5%.

Even if this fiber is bent, the polarization-plane storing property attained is very small. Therefore, the fiber cannot be used for a gyro as described above.

In the preferred optical fiber, by further reducing the difference of the refractive index between the core and cladding so as to adjust $$\frac{n1 - n2}{2n1} \times 100\%$$

to 0.13±0.05%, the intended polarization-plane storing property can be improved to a practically applicable level.

Figure 32A:
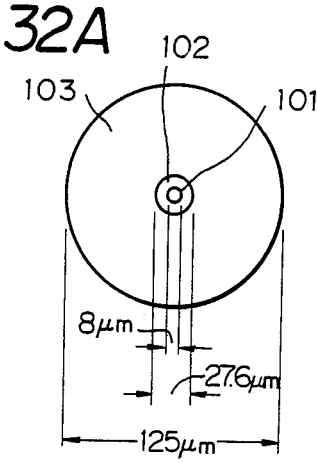
Figure 32C:
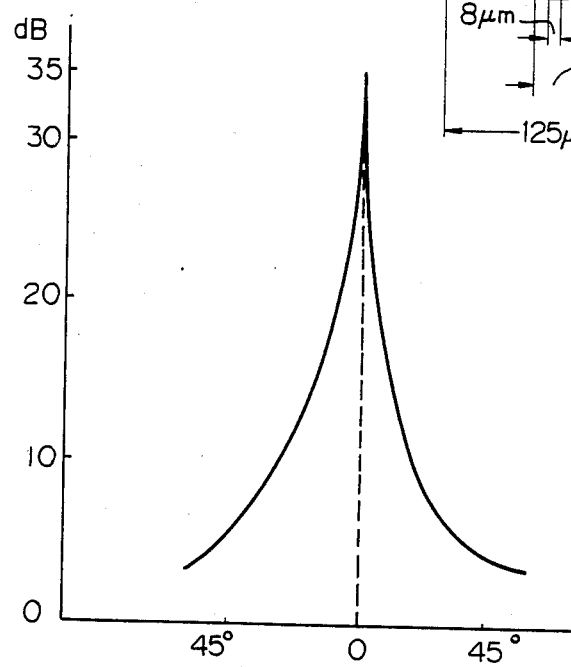
Figure 32B:
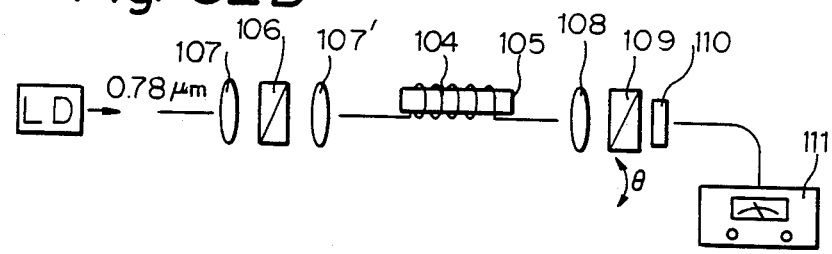

The preferred polarization-plane storing fiber is shown in FIGS. 32A to 32C, in which 32A is an enlarged cross-section of the fiber, FIG. 32B is a block diagram of the structure for measuring the polarization-plane storing property, and FIG. 32C is a curve of the polarization-plane storing characteristics.

The optical fiber shown in FIG. 32A has a triple structure comprising a core 101 having a circular section, a clad 102 having a circular section, and a jacket 103 having a circular section. The refractive index ratio is adjusted to 0.13. The dimensions are as shown in FIG. 32A. About 500 m of the optical fiber 104 is wound on a drum 105 having a diameter of 150 mm, as shown in FIG. 32B. A semiconductor laser beam having a wavelength of 0.78 μm is incident on the starting end of the optical fiber 104 through a deflecting prism 106 and lenses 107 and 107', a linearly polarized laser beam is propagated in the coil, and an output light emerging from the other end of the fiber 104 is guided to a detector 110 through a condenser lens 108 and a rotation analyzer 109 to actuate an output meter 111.

In FIG. 32C, the angle θ of the linear polarization plane of the light, obtained by rotating the analyzer 109, is plotted on the abscissa and the value (dB) indicated on the output meter 111 is plotted on the ordinate. The obtained curve of the characteristics shown in FIG. 32C indicates that the preferred optical fiber has a good polarization-plane storing property.

As is apparent from the foregoing description, the preferred polarization-plane storing fiber can be manufactured according to steps similar to those adopted for production of conventional optical fibers, connection of fibers can be accomplished only by center alignment, and no special attention need be paid to winding of the fiber on the drum. Accordingly, an excellent effect of eliminating the defects of conventional fibers of this type can be attained.

We claim:
1. A fiber-optic gyro comprising
   a laser diode,
   a light detector,
   a half-mirror,
   first and second lenses arranged on both sides of said half-mirror, and
   first and second optical fibers each having two ends, a respective first of said ends of each of said fibers being aligned with a respective end of the other fiber, and said half-mirror being interposed between said aligned ends,
   a third optical fiber having two ends, said third optical fiber being arranged in a coil and so that said two ends are arranged to be parallel to respective portions of said first ends of the first and second optical fibers, wherein light from the laser diode is incident on the half-mirror through the first lens to produce two light beams, the first of said light beam being reflected from the half-mirror and incident on a first one of said ends of the third optical fiber through the first lens, and the second light beam being transmitted through the half-mirror and incident on the other end of the third optical fiber through the second lens, so that said light beams are propagated through the third optical fiber in opposite directions, and means for synthesizing the light beams from the third optical fiber into a combined beam that is incident on the light detector, wherein the speed of the rotation angle is detector by the output of the light detector.

2. A fiber-optic gyro according to claim 1, wherein each said lens is formed of a monoaxial crystal.

3. A fiber-optic gyro according to claim 1, wherein said third optical fiber is a polarization plane storing fiber.

4. A fiber-optic gyro according to claim 3, wherein a control portion for the polarization plane is formed between said laser diode and said first lens for providing fine adjustment of the polarization plane of incident light and a polarization maintaining axis of the third optical fiber.

5. A fiber-optic gyro according to claim 4, wherein another control portion for providing fine adjustment of the polarization plane is formed on a part of said third optical fiber.

6. A fiber-optic gyro according to claim 1, wherein said laser diode is provided with a narrow-band reflection filter.

7. A fiber-optic gyro according to claim 6, wherein an etalon formed with a single-mode optical fiber having a plane reflecting mirror arranged on one end face is used as the narrow-band reflection filter.

8. A fiber-optic gyro according to claim 1, wherein said third optical fiber comprises a fiber of quartz and has a triple structure including a core, a clad and a jacket in which the difference of the refractive index between the core and clad (in terms of $$(\frac{n1 - n2}{2n1} \times 100$$

in which n1 represents the refractive index of the core and n2 stands for the refractive index of the clad) is 0.13±0.05, said third optical fiber being wound on a drum to provide said coil.

9. A fiber-optic gyro according to claim 3, wherein a control portion for the polarization plane is formed on a part of said third optical fiber for providing fine adjustment of the polarization plane.

10. A fiber-optic gyro comprising
a half-mirror including a dielectric multilayer film formed on one surface of an optical substrate,
first and second optical fibers each having two ends, a respective first of said ends of each of said fibers being aligned with a respective end of the other of said fibers, said half-mirror being interposed between said aligned ends,
a third optical fiber fiber having a single-mode and a polarization-plane storing-property and forming a coil, said third optical fiber having two ends and being arranged so that each of said ends of the single-mode fiber are parallel to a respective portion of a respective one of said first ends of the first and second optical fibers, with the half-mirror being interposed between both said ends of said third optical, and between said aligned ends of the first and second fibers, and both said ends of said third optical fiber being tilted with respect to the optical axes of said respective portions of said first and second optical fibers, and
a light detector, wherein a single-mode laser beam of a predetermined polarization is incident on the second end of the first optical fiber, a laser beam emerging from said first end of the first optical fiber is divided into two light beams by said half-mirror, said two light beams are incident on respective ones of said ends of said third optical fiber and propagate through said third optical fiber in opposite directions, the light beams emergent from both ends of said third optical fiber are synthesized into a combined beam that is incident on said first end of the second optical fiber, and a light beam emerging from the other end of the second optical fiber is detected by said light detector.

11. A fiber-optic gyro according any one of claims 1 to 10, wherein the position of said half-mirror is changed by an electrostriction element, for providing a phase difference between said light beams incident on said ends of said third optical fiber, and, only when the light synthesized by said half-mirror is converted to an electric signal, is phase detection carried out and the phase difference measured.

12. A fiber-optic gyro according to claim 11, comprising
means for adjusting the coil delay time $\tau$coil, which is determined by the length L of said third optical fiber and the light propagation speed c of said third optical fiber, and the light emission time interval D of said laser beam, so that the following relation is established:

$$D \geq \tau\text{coil},$$

said light detector including an electric gate,
wherein the light emission time interval D is made equal to a time interval $D_{det}$ for opening said electric gate in the light detector, and the time deviation between said interval D and said interval $D_{det}$ is made equal to said coil delay time $\tau$coil.

13. A fiber-optic gyro, which comprises
a Rochon prism having the same tilt angle $\alpha_1$ on respective incident and emergent end faces thereof,
an input optical fiber having a core, an optical axis parallel to the mechanical axis of the Rochon prism and a tilt angle $\theta p$ on the emergent end face arranged at a point separated by a distance h from said mechanical axis of the Rochon prism,
a first lens having a focal distance F, which is interposed between the input optical fiber and the Rochon prism and has a center at a point separated by a distance $I_1$ from said incident end face of the Rochon prism on said mechanical axis of the Rochon prism,
two output optical fibers having cores and being arranged at points separated by a distance h from an axis parallel to said mechanical axis passing through the equivalent light branching point of the Rochon prism and having respective tilt angles of $\theta p$ and $-\theta p$ on said incident end faces thereof, and a second lens having a focal distance F, which is interposed between both the optical fibers and the Rochon prism and has the center on an axis parallel to said mechanical axis of the Rochon prism and separated by a distance $I_1$ from said equivalent light branching point, wherein the tilt angle $\alpha_1$ of the Rochon prism, the emergent angle $\theta o$ of the input optical fiber, the incident angle $\theta r$ of the output optical fiber, and the focal distance F of both the lenses are determined by the following relations:

$$\alpha_1 = \left( \frac{+n_e}{n_e + n_o - 2} \right) \cdot \delta$$

$$\theta o = \theta r = \sin^{-1}(n_c/n_a \cdot \sin p) - \theta p, \text{ and}$$

-continued
$$\theta o = \theta r = (I_1 - F)h/F^2$$

wherein $n_e$ represents the refractive index of the Rochon prism with respect to an abnormal light beam, $n_o$ represents the refractive index of the Rochon prism with respect to a normal light beam, $\delta$ stands for a separation angle in the Rochon prism as between abnormal and normal light beams, $n_c$ stands for the refractive index of said inlet and outlet optical fiber cores, and $n_a$ stands for the refractive index of air.

14. A fiber-optic gyro according to any one of claims 1, 10 and 13, wherein at least one reflecting member is arranged to confront a respective light emitting parts of at least one end portion of said laser diode so that at least one etalon is constructed.

15. A fiber-optic gyro according to claim 14, wherein said at least one reflecting member is a reflecting film formed on the respective end face of said the respective optical fiber.

* * * * *

UNITED STATES PATENT AND TRADEMARK OFFICE
CERTIFICATE OF CORRECTION

PATENT NO. : 4,621,925

DATED : NOVEMBER 11, 1986

INVENTOR(S) : SHIGEFUMI MASUDA ET AL.

It is certified that error appears in the above-identified patent and that said Letters Patent is hereby corrected as shown below:

FRONT PAGE, [56] References Cited, line 7, "Matsumura" should be --Matsumura et al.--.

FRONT PAGE, [57] ABSTRACT,
    line 3, "half mirror" should be --half-mirror--;
    line 6, "half mirror" should be --half-mirror--;
    line 10, "half mirror" should be --half-mirror--.

Col. 2, line 15, "above mentioned" should be --above-mentioned--;
    line 22, "The beam" should be --The light beam--;
    line 52, "singlemode" should be --single-mode--;
    line 61, "on" should be --of--.

Col. 3, line 5, "consituted" should be --constituted--;
    line 17, "$\alpha_1$" should be --$\ell_1$--;
    line 68, "right" should be --right angles, which--.

Col. 4, line 30, delete "of the rate of";
    line 31, "change of detection" should be --of detection of the rate of change--;
    line 34, "B" should be --8B--;
    line 60, "fiberoptic" should be --fiber optic--.

Col. 5, line 35, "a and b." should be --$\underline{a}$ and $\underline{b}$.--;
    line 36, "a" (first occurrence) should be --$\underline{a}$--;
    line 39, "b" should be --$\underline{b}$--.

UNITED STATES PATENT AND TRADEMARK OFFICE
CERTIFICATE OF CORRECTION

PATENT NO. : 4,621,925
DATED : NOVEMBER 11, 1986
INVENTOR(S) : SHIGEFUMI MASUDA ET AL.

It is certified that error appears in the above-identified patent and that said Letters Patent is hereby corrected as shown below:

Col. 6, line 2, "+θ," should be --+θ,--;
       line 11, change "is," to --is changed to -θ,--;
       line 28, "member" should be --members--.

Col. 7, line 6, equation 1, "Rl" should be --R$\ell$·--;
       line 8, "l" should be --$\ell$--;
       line 29, "beams" should be --beams,--;
       line 39, "half mirror" should be --half-mirror--;
       line 60, "half mirror" should be --half-mirror--.

Col. 8, line 8, "rector" should be --vector--;
       line 32, "in case" should be --in the case--;

line 63, (equation 7), "$(T_3)^1$" should be --$(T_3)^t$--.

Col. 9, line 3, (equation 9), "$\emptyset x)$" should be --$\Psi x)$--;
       line 51, (equation 16), before "the left parenthesis mark" insert --·--;
       line 53, (equation 16), before "the left parenthesis mark" insert --·--;
       line 58, (f1" should be --$(f_1$--;
       line 58, "f2" should be --$f_2$--.

Col. 10, line 1, "Ily" should be --$I_1 y$--;

line 33, "Ilx and Ily" should be --$I_1 x$ and $I_1 y$--;

line 39, "Ilx and Ily" should be --$I_1 x$ and $I_1 y$--.

UNITED STATES PATENT AND TRADEMARK OFFICE
CERTIFICATE OF CORRECTION

PATENT NO. : 4,621,925

DATED : NOVEMBER 11, 1986

INVENTOR(S) : SHIGEFUMI MASUDA ET AL.

Page 3 of 5

It is certified that error appears in the above-identified patent and that said Letters Patent is hereby corrected as shown below:

Col. 11, line 8, delete "be";
line 25, "5B(a)" should be --5B-(a)--;
line 26, "1" (both occurrences) should be --$\ell$--;
line 65, "1=360" should be --$\ell$=360--.

Col. 12, line 9, "half mirror" should be --half-mirror--;
lines 60-61, in the equation, " $\frac{12L}{01}$ "  should be  -- $\frac{1}{0}\frac{2L}{1}$ --.

Col. 13, line 20, "half mirror" should be --half-mirror--;
line 38, "half mirror" should be --half-mirror--.

Col. 14, line 63, "half mirror" should be --half-mirror--.

Col. 15, line 16, "half" should be --half- --;
line 17, "mirrow" should be --mirror--;
line 29, "14(c)" should be --(14-(a)--;
line 29, "14,(a)" should be --14-(a)--.

Col. 16, line 11, "half mirror" should be --half-mirror--;
line 24, "stage" should be --state--;
line 33, "light CCW" should be --light beams CCW--;
line 33, "half mirror" should be --half-mirror--;
line 58, "half mirror" should be --half-mirror--.

UNITED STATES PATENT AND TRADEMARK OFFICE
CERTIFICATE OF CORRECTION

PATENT NO. : 4,621,925

DATED : NOVEMBER 11, 1986

INVENTOR(S) : SHIGEFUMI MASUDA ET AL.

It is certified that error appears in the above-identified patent and that said Letters Patent is hereby corrected as shown below:

Col. 18, line 37, "$l_1$" should be --$\ell_1$--;

line 38, "I above)," should be --$I_1$ above),--;

line 57, (equation 43), "$l_1/F^2$)" should be --$\ell_1/F^2$--;

line 63, "$l_0$" should be --$\ell_0$--.

Col. 19, line 6, (equation 46), "($l_1$" should be --($\ell_1$--;

line 8, "$l_1$," should be --$\ell_1$,--;

line 17, (equation 47), "($N_c$" should be --($n_c$--;

line 32, "beams and" should be --beams, and--;
line 43, before "Beams" insert --Light--;
line 43, "Beams" should be --beams--;
line 56, "of light." should be --of the light.--.

Col. 20, line 22, delete "the";
line 35, "In FIG. 22, (a)" should be --FIG. 22-(a)--;
line 43, "oututs" should be --outputs--;
line 62, "C stands" should be --c stands--.

Col. 21, line 21, "mirrow" should be --mirror--;
line 28, "ends axis of 81a," should be --ends of 81a,--;
line 55, "C" should be --c--;
line 56, "vacuum." should be --in vacuum.--;
line 60, "FIG. 4-(e)" should be --FIG. 22-(e)--.

UNITED STATES PATENT AND TRADEMARK OFFICE
CERTIFICATE OF CORRECTION

PATENT NO. : 4,621,925

DATED : NOVEMBER 11, 1986

INVENTOR(S) : SHIGEFUMI MASUDA ET AL.

It is certified that error appears in the above-identified patent and that said Letters Patent is hereby corrected as shown below:

Col. 22, line 49, "semicodnuctor" should be --semiconductor--;
 line 61, "illuminescence" should be --luminescence--.

Col. 23, line 17, "$n_1$," should be --$n_\varrho$,--;
 line 19, "has a ap-" should be --has an ap- --.

Col. 24, line 14, delete "the";
 line 15, "width" should be --width,--.

Col. 25, line 7, "fluctuating" should be --fluctuation--;
 line 57, "otpical" should be --optical--.

Col. 27, line 17, "detector" should be --detected--;
 line 65, delete "fiber" (second occurrence).

Col. 29, last line, "θo=θr" should be --$\theta_o = \theta_r$--; and

"sin p" should be --sin θp--.

Col. 30, line 1, "θo=θr" should be --$\theta_o = \theta_r$--; and line 1, "($I_1$" should be --($\underline{I}_1$--.

Signed and Sealed this

Twenty-fourth Day of November, 1987

Attest:

DONALD J. QUIGG

*Attesting Officer*   *Commissioner of Patents and Trademarks*